(12) United States Patent
Wynn et al.

(10) Patent No.: US 8,346,673 B2
(45) Date of Patent: Jan. 1, 2013

(54) SYSTEM AND METHOD FOR PROVISIONING AUDIOVISUAL WORKS

(75) Inventors: Dominic C. Wynn, Oxford (GB); Philip M. Williams, Sandhurst (GB); Malachi G. Simons, Uxbridge (GB); Nicholas F. Wilkins, Shepperton (GB); Alistair Macrow, Chelmsford (GB); Nigel A. Dufty, Ascot (GB); Alvin Eng, London (GB); Michael J. Doherty, Emsworth (GB); David M. Groves, Barnham (GB)

(73) Assignee: Blockbuster L.L.C., Englewood, CO (US)

( * ) Notice: Subject to any disclaimer, the term of this patent is extended or adjusted under 35 U.S.C. 154(b) by 3035 days.

(21) Appl. No.: 10/842,147

(22) Filed: May 10, 2004

(65) Prior Publication Data

US 2006/0015352 A1    Jan. 19, 2006

(51) Int. Cl.
 *G06Q 50/00*        (2012.01)
(52) U.S. Cl. ........................................ 705/307
(58) Field of Classification Search ............... 705/1, 307
See application file for complete search history.

(56) References Cited

U.S. PATENT DOCUMENTS

| | | | | |
|---|---|---|---|---|
| 5,095,195 A | 3/1992 | Harman et al. | ............... | 235/381 |
| 5,664,110 A | 9/1997 | Green et al. | .................... | 705/26 |
| 5,704,017 A | 12/1997 | Heckerman et al. | ............ | 395/61 |
| 5,752,160 A | 5/1998 | Dunn | ............................. | 455/5.1 |
| 5,790,426 A | 8/1998 | Robinson | ..................... | 364/554 |
| 5,842,199 A | 11/1998 | Miller et al. | ....................... | 707/2 |
| 5,861,906 A | 1/1999 | Dunn et al. | ........................ | 348/7 |
| 5,884,282 A | 3/1999 | Robinson | ......................... | 705/27 |
| 5,918,014 A | 6/1999 | Robinson | ................. | 395/200.49 |
| 5,918,213 A | 6/1999 | Bernard et al. | .................. | 705/26 |
| 5,945,987 A | 8/1999 | Dunn | ............................. | 345/327 |
| 5,959,945 A | 9/1999 | Kleiman | ......................... | 369/30 |
| 6,012,052 A | 1/2000 | Altschuler et al. | ................. | 707/2 |
| 6,016,475 A | 1/2000 | Miller et al. | ....................... | 705/1 |
| 6,029,161 A | 2/2000 | Lang et al. | ........................ | 707/1 |
| 6,041,311 A | 3/2000 | Chislenko et al. | .............. | 705/27 |
| 6,049,777 A | 4/2000 | Sheena et al. | .................... | 705/10 |
| 6,064,980 A * | 5/2000 | Jacobi et al. | ..................... | 705/26 |
| 6,065,042 A | 5/2000 | Reimer et al. | ................ | 709/203 |
| 6,067,562 A | 5/2000 | Goldman | ...................... | 709/206 |

(Continued)

FOREIGN PATENT DOCUMENTS

JP      2001-243285      9/2001

OTHER PUBLICATIONS

Kenton County Public Library, "The Talking Book Library," http://web.archive.org/web/19980130051137/www.kenton.lib.ky.us/talking.html, 3 pages, Jul. 8, 2003.

(Continued)

*Primary Examiner* — Dennis Ruhl
(74) *Attorney, Agent, or Firm* — Kilpatrick Townsend & Stockton LLP

(57) ABSTRACT

A method for provisioning audiovisual works to a client includes maintaining categorization information specifying, for each of multiple audiovisual works, one or more of multiple categories. One or more of the categories are associated with each of multiple delivery slots in response to input from a client. For each of the delivery slots, a first audiovisual work from one of the categories associated with the respective delivery slot is provisioned for delivery to a location associated with the client.

39 Claims, 13 Drawing Sheets

U.S. PATENT DOCUMENTS

| | | | | |
|---|---|---|---|---|
| 6,092,049 | A | 7/2000 | Chislenko et al. | 705/10 |
| 6,108,493 | A | 8/2000 | Miller et al. | 395/200.49 |
| 6,112,186 | A | 8/2000 | Bergh et al. | 705/10 |
| 6,236,985 | B1 | 5/2001 | Aggarwal et al. | 707/2 |
| 6,286,139 | B1 | 9/2001 | Decinque | 725/5 |
| 6,289,389 | B1 | 9/2001 | Kikinis | 709/239 |
| 6,308,168 | B1 | 10/2001 | Dovich et al. | 707/1 |
| 6,321,179 | B1 | 11/2001 | Glance et al. | 702/189 |
| 6,321,221 | B1 | 11/2001 | Bieganski | 707/5 |
| 6,334,127 | B1 | 12/2001 | Bieganski | 707/5 |
| 6,389,372 | B1 | 5/2002 | Glance et al. | 702/189 |
| 6,412,012 | B1 | 6/2002 | Bieganski | 709/232 |
| 6,484,123 | B2 | 11/2002 | Srivastava | 702/181 |
| 6,487,539 | B1 | 11/2002 | Aggarwal et al. | 705/14 |
| 6,487,541 | B1 | 11/2002 | Aggarwal et al. | 705/26 |
| 6,496,816 | B1 | 12/2002 | Thiesson et al. | 706/52 |
| 6,584,450 | B1 | 6/2003 | Hastings et al. | 705/26 |
| 6,662,231 | B1 * | 12/2003 | Drosset et al. | 709/229 |
| 7,024,381 | B1 | 4/2006 | Hastings et al. | 705/26 |
| 2001/0036271 | A1 | 11/2001 | Javed | 380/217 |
| 2003/0084450 | A1 * | 5/2003 | Thurston et al. | 725/46 |
| 2005/0086127 | A1 | 4/2005 | Hastings et al. | 705/26 |

OTHER PUBLICATIONS

The Library of Congress, "Procurement and Supply Division," Bidder's Conference, The National Library Service for the Blind and Physically Handicapped, 17 pages, Sep. 1, 1987.
Matsuyama Toshinori, "Rental Video Tape Order System," 1 page, Jun. 7, 2005.
"The Unabashed Librarian," No. 82, p. 3, 1 page, May 5, 2005.
Brad Dick Editor, "The Future of Television," Intertec Publishing Corporation, a Primedia Co., 1 page, Dec. 1999.
Netflix.com, Inc. "About Netflix," 1 page, © 1997-2002.
American Action Fund for Blind Children and Adults, "Facts About the Library," http://web.archive.org/web/20000104114940/www.actionfund.org, 2 pages, undated.
American Action Fund for Blind Children and Adults, "Application for Library Services," Kenneth Jernigan Library for Blind-Children, http://web.archive.org/web/19991103190509/ww.actionfund.org, 3 pages, Feb. 26, 2004.
Frank Johnson, "Audio Diversions: Where Books Talk and People Listen," Publishers Weekly, 2 pages, Feb. 26, 2004.
Frank Johnson, "Audio Diversions: Literature for Listening Club™," http://web.archive.org/web/20000309021742/www.audiodiversions.com, 2 pages, Aug. 31, 2003.
Audiobook Search, http://web.archive.org/web/2000309073728/www.audiodiversions.com, 2 pages, Aug. 31, 2003.
books on tape.com, http://web.archive.org/web/19990424061355/http://www.booksontape.com, 2 pages, Aug. 31, 2003.
booksontape.com, "More About B-O-T® & Frequently Asked Questions," http://web.archive.org/web/19990508223402/www.booksontape.com/i/help.htm, 11 pages, Aug. 31, 2003.
© 1999 DVD Overnight, Inc., America's Online Door to Door Rental Store, DVD Overnight—America's Online Door to Door DVD R . . . , http://web.archive.org/web/19990922160527/http://www.dvdovernight.com, 2 pages, 1999.
© 1999 DVD Overnight, Inc. "Getting Started to Rent or Buy DVDs Online At DVD Overnight," http://web.archive.org/web/20000304111243/www.dvdovernight.com/started.html, 7 pages, 1999.
© 1999 DVD Overnight, Inc. "DVD Overnight Store Policies & Frequently Asked Questions," DVD Overnight—Customer Service, http://web.archive.org/web/19991123014901/www.dvdovernight.com/service.html, 8 pages, 1999.
© 2000 DVD Overnight, Inc., "Customer Service Questions & Answers," DVDOvernight Movies—America's Online Door to Door, http://web.archive.org/web/20001109071400/www.dvdovernight.com/dvd/custservice.html 5 pages, 2000.
© 2000 DVD Overnight, Inc., "DVD Cache Frequently Asked Questions,"DVD Cache Customer Service, http://web.archive.org/web/20000512001209/www.dvdcache.com/store/customer_service. html, 5 pages, 2000.

Libraries, "R.G. 40: Libraries," http://www.archives.mcgill.ca/resources/guide/vol1/rg40.htm, 8 pages, Feb. 26, 2004.
Fastlane Video & Records—Rental Prices, http://web.archive.org/web/19990506190744/members.aol.com/atfastlane/video/rental. htm, 1 page, 1999.
"5 Day Rental," Fastlane Video & Records, http://web.archive.org/web/19990210101315/members.aol.com/atfastlane/video/index. htm 13 pages, Feb. 27, 2004.
Fastlane Video & Records, http://web.archive.org/web/19990209181937/members.aol.com/atfastlane, 2 pages, 1999.
"Make Your Payments Online," Fastlane Video & Records—Payment on Account, http://web.archive.org/web/19990504102814/members.aol.com/atfastlane/video/payment. htm, 1 page, 1999.
"Try Before You Buy Program," http://web.archive.org/web/19990922040420/www.gametradersclub.com/gametradersclub/tryb.html, 2 pages, 1999.
Trade or Sell Your Games!, Todd @ Game Traders Club!, http://web.archive.org/web/19991010012624/www.gametradersclub.com/gametradersclub/tradeorselyou.html, 2 pages, 1999.
"Try Before You Buy Program," http://web.archive.org/web/19991012021059/www.gametradersclub.com/gametradersclub/tryb.html, 2 pages, 1999.
Peter F. McNally, "Print Culture and English Speaking Quebec," History of the Book in Canada, http://www.hbic.library.utoronto.ca/fconfmcnally_fr.htm, 5 pages, Feb. 26, 2004.
Roger Ebert, "Welcome to Home Film," Home Film Festival, http://web.archive.org/web/19961106000542/www.homefilmfestival.com/frames/index1. html, 3 pages, 1996.
"Join Home Film Festival and enjoy these features," Home Film Festival, http://web.archive.org/web/19961106001054/www.homefilmfestival.com/membership.html 2 pages, 1996.
"It's easy! Ordering info," Home Film Festival, http://web.archive.org/web/19961106001006/www.homefilmfestival.com/infopack.html, 2 pages, 1996.
Online Video Rentals, "Multiple Rental Order Form," http://web.archive.org/web/19990420045928/www.home..., 3 pages, Jul. 2, 2003.
Online Video Rentals, "Individual Rental Order," http://web.archive.org/web/19990127160422/www.home..., 3 pages, Jul. 2, 2003.
"Welcome to the Internet's 1st DVD rental program," Magic Disc Entertainment, http://web.archive.org/web/19981206142316/www.magicdisc.com/rentals/rentalprogram.htm, 2 pages, Feb. 27, 2004.
"Welcome to the Internet's 1st DVD rental program," Magic Disc Entertainment, http://web.archive.org/web/19990503073644/www.magicdisc.com/rentals/rentalprogram.htm, 3 pages, 1999.
"Featured DVDs for Saturday, Jan. 16, 1999," NetFlix.com, http://web.archive.org/web/19990117011532/http://www..., 5 pages, Jul. 3, 2003.
"DVD Favorites," NetFlix.com, http://web.archive.org/web/19991204131346/www.netfli..., 4 pages, Jul. 3, 2003.
Barbara Cheadle, "Future Reflections," ISSN 0883-3419, National Federation of the Blind, http://www.nfb.org/fr/frl/93win.htm, 5 pages, Aug. 23, 2003.
"Hear Ye! Hear Ye!," National Federation of the Blind, http://web.archive.org/web/19990220032120/www.nfb.org, 7 pages, 1999.
David Esposito (cooldej@home.com), "Need Cheep Games," alt.games.sony-playstation, http://groups.google.com, 1 page, Feb. 7, 1999.
Ramon (ramon@theriver.com), "100's of Games for About a Buck a Day . . . (Incredible Deal)," alt.games.video.sony-playstation, http://groups.google.com, 1 page, Feb. 6, 1999.
Ramon (ramon@theriver.com), "Best Deal Around 100's of games for about a buck a day," alt.games.video.sony-playstation, http://groups.google.com, 1 page, Feb. 8, 1999.
Ramon (ramon@theriver.com), "Best Deal Ever!! Choose From 100's of Games for About a Buck a Day . . . Plus a Free Playstation," alt.games.video.sony-playstation, http://groups.google.com, 1 page, Feb. 9, 1999.
Ramon (ramon@theriver.com), "Best Deal I've Ever Seen . . . 100's of Games for About a Buck a Day," alt.games.video.nintendo-64, http://groups.google.com, 1 page, Feb. 8, 1999.

Ramon (ramon@theriver.com), "Best Deal Ever . . . All the N-64 Games You Want for About a Buck a Day," alt.games.video.nintendo-64, http://groups.google.com, 3 pages, Feb. 10, 1999.

Ramon (ramon@theriver.com), "All the New Playstation Games Are Yours for About a Buck a Day," alt.games.video.sony-playstation, http://groups.google.com, 1 page, Feb. 10, 1999.

Test (ramon@theriver.com), "Check Out the New Web Site (Best Deal I've Seen)," alt.games.video.nintendo-64, http://groups.google.com, 1 page, Jul. 11, 1999.

Test (ramon@theriver.com), "How Many Games Can You Beat in a Month?," alt.games.video.nintendo-64, http://groups.google.com, 1 page, Jul. 11, 1999.

David N. Berkwitz, "A New Way to Avoid Exercise," U.S. Edition Newsweek, Cyberscope (R); Web; p. 15, 1 page, Mar. 15, 1999.

The Unabashed Librarian, No. 82, p. 3, 1 page, no date.

Kevin Brass, "Company Town; Rental Control; Video Distributor Takes Industry Down Controversial Path," http://faculty-gsb.stanford.edu/oyer_c..., 2 pages, Nov. 28, 1997.

Mary L. Daniels, "A Love for Libraries: Whether Large or Small, They are Special Places," Orlando Sentinel (Florida), Editorial; p. A19, Copyright 1994 Sentinel Communications Co., 2 pages, Nov. 11, 1994.

Jennifer deJong, "Securing Your Site for the Age of E-commerce," VAR Business Strategy Guide Supplement, p. 9,10; ISSN: 0894-5802, Copyright 1998 Responsive Database Services, Inc., 3 pages, Nov. 16, 1998.

"Door-to-Door Service," High Points, vol. 6, No. 2; p. 50; ISSN: 1074-293X, Copyright 1999 Responsive Database Services, Inc., 2 pages, Feb. 1999.

Larry Greenemeier, "Manna Rises Above Conventional Net Marketing: Manna Network Technologies; Company Business and Marketing," Midrange Systems, No. 18, vol. 11; p. 41; ISSN: 1041-8237; Copyright 1998 Information Access Company, 2 pages, Dec. 18, 1998.

Hilda M. Hamlyn, "Eighteenth-century Circulating Libraries in England," The Bibliographical Society, cover page; pp. 197-222, no date.

Alan S. Horowitz, "PC Leasing Gains Ground—Shorter life spans popularize practice," Information Week, Copyright 1998 CMP Media, Inc., 3 pages, May 25, 1998.

Bob Ingram, "Boston Bears Watching; supermarket industry in Massachusetts," Supermarket Business, No. 3, vol. 53; p. 41; ISSN: 0196-5700, Copyright 1999, Information Access Company, 5 pages, Mar. 1, 1999.

Nancy J. Kim, "Nordstrom sees Net gains with Streamline," Puget Sound Business Journal, vol. 19; No. 25; p. 5, Copyright 1998 UMI Inc., 2 pages, Oct. 30, 1998.

Alan Dugald McKillop, "English Circulating Libraries, 1725-50," The Bibliographical Society, 10 pages, no date.

Carol Memmott, "Web site streamlines your errands," USA Today, Bonus; p. 5E, Copyright 1998 Gannett Company, Inc., 2 pages, Nov. 16, 1998.

"News briefs," Video Store, p. 8; 0195-1750; Copyright 1999 Information Access Company, 1 page, Mar. 21, 1999.

"Nordstrom Announces Partnership With Streamline; Nordstrom Invests $22.8 Million in Streamline, the Pioneer Provider of Consumer Direct Essential and Convenience Services," PR Newswire, Financial News Section, Copyright 1998 PR Newswire Association, Inc., 2 pages, Oct. 8, 1998.

Carolyn Said, "Chips and Flicks On Your Doorstep," The San Francisco Chronicle, Business; p. B1, Copyright 1999 The Chronicle Publishing Co., 4 pages, Oct. 18, 1999.

Linda Shrieves, "Now Library Books Just Show Up At Your Door," Orlando Sentinel (Florida), Style; p. E1, Copyright 1990 Sentinel Communications Co., Dec. 7, 1990.

Streamline, DSN Supercenter & Club Business, vol. 6, No. 6; p. 5, Copyright 1999 Responsive Database Services, Inc., 1 page, Mar. 29, 1999.

Hal R. Varian, "Buying, Sharing and Renting Information Goods," University of California at Berkeley, cover page; pp. 1-19, Dec. 1994 Current Version Aug. 5, 2000.

Hal R. Varian and Richard Roehl, "Circulating Libraries and Video Rental Stores," Universtiy of California, Berkeley and University of Michigan, Dearborn, pp. 1-14, Dec. 1996.

Richard Roehl and Hal R. Varian, "Circulating Libraries and Video Rental Stores," University of Michigan, Dearborn and University of California, Berkeley, 13 pages, Dec. 1996 Revised: Mar. 9, 2000.

Guinevere L. Griest, "Mudie's Circulating Library and the Victorian Novel," Copyright © 1970 by Indiana University Press, Library of Congress catalog card No. 76-126210; ISBN: 253-15480-4, 282 pages, 1970.

Kathleen Clynes, McLellan Travelling Library of McGill University, pp. 394-395, no date.

James Lardner, "Fast Forward, Hollywood, The Japanese, and the Onslaught of the VCR," W.W. Norton & Company, 36 pages, © 1987.

Wayne A. Wiegland and Donald G. Davis, Jr., "Encyclopedia of Library History," Garland Publishing, Inc., New York and London, 5 pages, 1994.

Glenn Miller, "Customer Service & Innovation in Libraries," The Highsmith Press Handbook Series, 19 pages, 1996.

Judith Wagner, Joseph W. Haaf and Ruth N. Cuadra, "Automated Circulation Systems in Libraries Serving the Blind and Physically Handicapped: A Reference Guide for Planning," Cuadra Associates, Inc., 136 pages, May 15, 1981.

"Access Self-Study," Texas State Library, Division for the Blind & Physically Handicapped, vol. 7, Functional Requirements, (C.01-C.11), 14 pages, Dec. 15, 1987.

* cited by examiner

*FIG. 9B*  FROM FIG. 9A

| | | |
|---|---|---|
| 6 | Family. Cartoons, Disney films, classic books, TV characters. From Bambi to Little Women. | ★☆☆☆☆ |
| 7 | Fantasy. Swords, and Sorcery, Mythology, Beasts. | ★★★☆☆ |
| 8 | General Interest (Leisure/Health) Keep fit, diet, travel, hobbies. Something for everyone in this range of DVDs. | ★☆☆☆☆ |
| 9 | Horror/Occult. Scary movies, ghosts and things that go bump in the night. From Signs to Exorcist. | ★★★☆☆ |
| 10 | Living World/Universe. The living world in your living room. Beautiful to look at and educational too. | ★☆☆☆☆ |
| 11 | Martial Arts. Kung Fu fighting, Triad gangs and Zen warriors. From Enter the Dragon to Police Story. | ★★★★★ |
| 12 | Music/Performing Arts. Rock, pop and classic concerts, ballet, theatre, mime and stand up comedians. | ★★☆☆☆ |
| 13 | Mystery/Whodunnit. Watching with detectives. Whodunits, whydunits, howdunits, as well as complete mysteries. | ★☆☆☆☆ |
| 14 | Science Fiction. Galaxies far, far away, aliens and the final frontiers of space. | ★★★☆☆ |
| 15 | Sports. Great games, epoch-making wins and loses. Olympics and every sport on land, sea and in the air. | ★★★★★ |
| 16 | Thriller. Seat of the pants stuff with races against the clock, heroes, villains and compelling plots. | ★★★★★ |
| 17 | War. Real-life heroes and heroines, courage, adventure and the fight to survive. Are you brave enough? | ★★★★★ |
| 18 | Westerns. Whether you like your westerns spaghetti-style or otherwise, there's something for you here. | ★★★★☆ |

Select the classifications you want to include.

(18) ☐ (15) ✓ (12) ✓ PG ✓ U ✓ UC ✓ EXEMPT ✓ —266

Update —272

—260
—262

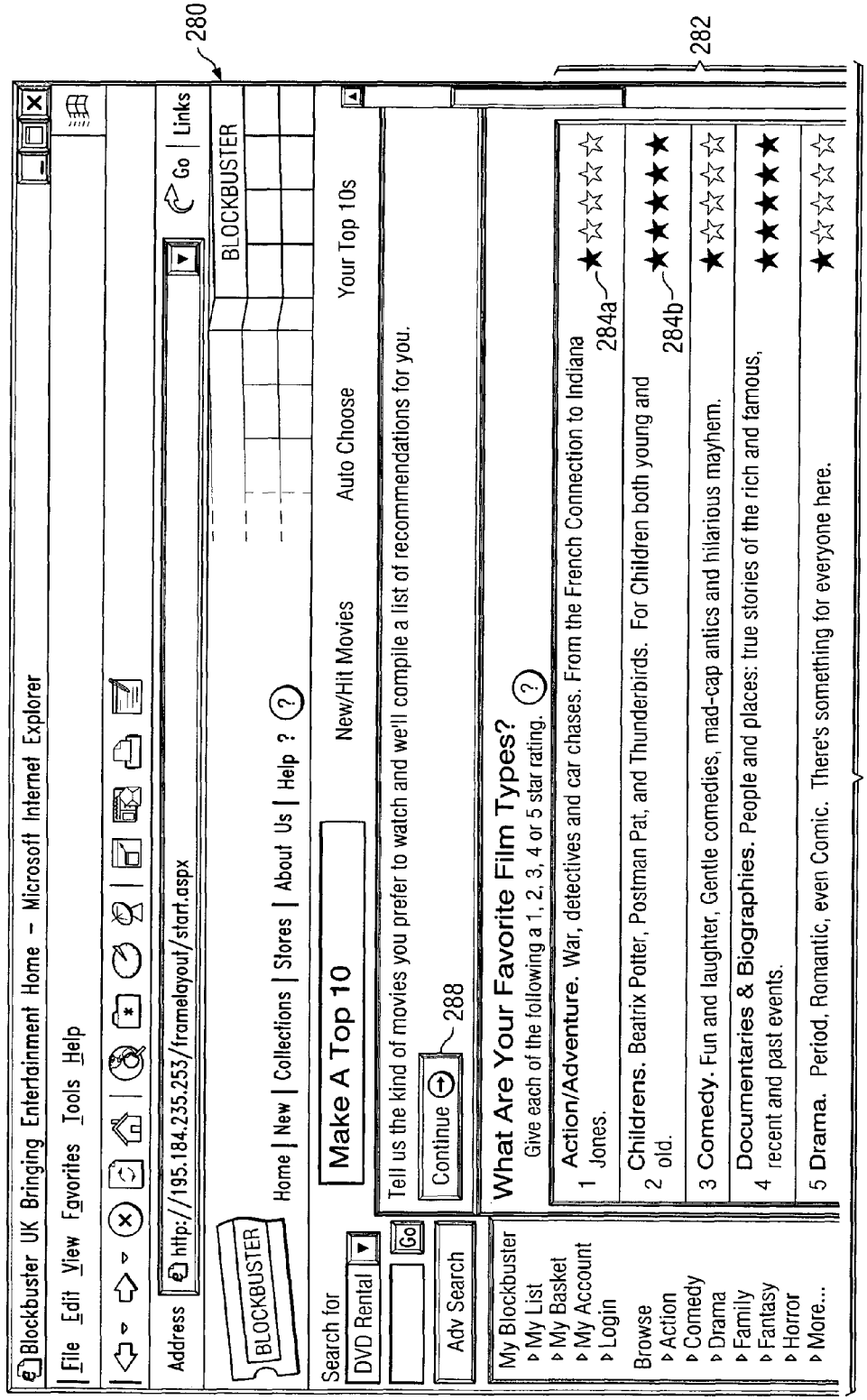

FIG. 10B

FROM FIG. 10A

| # | Category | Rating |
|---|---|---|
| 6 | Family. Cartoons, Disney films, classic books, TV characters. From Bambi to Little Women. | ★☆☆☆☆ |
| 7 | Fantasy. Swords, and Sorcery, Mythology, Beasts. | ★★★☆☆ |
| 8 | General Interest (Leisure/Health) Keep fit, diet, travel, hobbies. Something for everyone in this range of DVDs. | ★☆☆☆☆ |
| 9 | Horror/Occult. Scary movies, ghosts and things that go bump in the night. From Signs to Exorcist. | ★★★☆☆ |
| 10 | Living World/Universe. The living world in your living room. Beautiful to look at and educational too. | ★☆☆☆☆ |
| 11 | Martial Arts. Kung Fu fighting, Triad gangs and Zen warriors. From Enter the Dragon to Police Story. | ★★★★★ |
| 12 | Music/Performing Arts. Rock, pop and classic concerts, ballet, theatre, mime and stand up comedians. | ★★★☆☆ |
| 13 | Mystery/Whodunnit. Watching with detectives. Whodunits, whydunits, howdunits, as well as complete mysteries. | ★★★☆☆ |
| 14 | Science Fiction. Galaxies far, far away, aliens and the final frontiers of space. | ★★★★★ |
| 15 | Sports. Great games, epoch-making wins and loses. Olympics and every sport on land, sea and in the air. | ★★★★★ |
| 16 | Thriller. Seat of the pants stuff with races against the clock, heroes, villains and compelling plots. | ★★★★★ |
| 17 | War. Real-life heroes and heroines, courage, adventure and the fight to survive. Are you brave enough? | ★★★★★ |
| 18 | Westerns. Whether you like your westerns spaghetti-style or otherwise, there's something for you here. | ★☆☆☆☆ |

Select the classifications you want to include.

(18) ☐  (15) ✓  (12) ✓  PG ✓  U ✓  UC △  EXEMPT ✓

View My List    Continue →

SYSTEM AND METHOD FOR PROVISIONING AUDIOVISUAL WORKS

TECHNICAL FIELD OF THE INVENTION

The present invention relates generally to audiovisual works, and, more particularly, to a system and method for provisioning audiovisual works to clients.

BACKGROUND OF THE INVENTION

Traditionally, the rental of audiovisual works such as movies involves visiting a local retail establishment, such as a video store. Recently, alternative arrangements, such as online subscription services, have arisen.

SUMMARY OF THE INVENTION

In accordance with the present invention, techniques for providing audiovisual works to clients are provided. According to particular embodiments, these techniques enable the delivery of audiovisual works according to categories created and/or selected by clients and associated with delivery slots. For example, audiovisual works may be organized into several categories, and a delivery slot may be associated with one or more of the categories. The return of an audiovisual work may trigger the delivery of a subsequent audiovisual work, where both the returned audiovisual work and the subsequent audiovisual work are in categories associated with the same delivery slot. Alternatively or in addition, these techniques may recommend and/or automatically generate lists of audiovisual works for delivery to clients.

According to a particular embodiment, a method for provisioning audiovisual works to a client includes maintaining categorization information specifying, for each of multiple audiovisual works, one or more of multiple categories. One or more of the categories are associated with each of multiple delivery slots in response to input from a client. For each of the delivery slots, a first audiovisual work from one of the categories associated with the respective delivery slot is provisioned for delivery to a location associated with the client.

Embodiments of the invention provide various technical advantages. For example, these techniques may eliminate or reduce many difficulties associated with requiring clients to select and/or reselect particular audiovisual works to receive. A list of audiovisual works appropriate for a particular client may be generated based on one or more factors such as preferences of the client, inventory of available audiovisual works, evaluated qualities and/or popularities of the audiovisual works, and/or inventory history associated with the client. In some embodiments, the list may be used continuously to provide audiovisual works to the client after a list of expressly-selected audiovisual works becomes short due to delivery of audiovisual works to the client.

Other advantages include the ability to ensure that a client maintains a particular inventory of audiovisual works. In some embodiments, these techniques may ensure that clients maintain diverse inventories of audiovisual works, such as movies, video games, music, books, recorded books, and other appropriate materials, to satisfy the desires of multiple individuals and/or the changing moods of one individual. For example, these techniques may ensure that the preferences of each member of a household are met. If one member prefers action/adventure films, another prefers comedies, and a third prefers Westerns, these techniques may ensure that at least one of each type of film is available in the home at any time. Thus, these techniques may resolve conflicts created by disparate preferences between members of one household.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description, taken in conjunction with the accompanying drawings, in which:

FIG. 10 illustrates a graphical user interface for generating a list of recommended audiovisual works for presentation to a client.

DETAILED DESCRIPTION OF THE DRAWINGS

Figure 1:
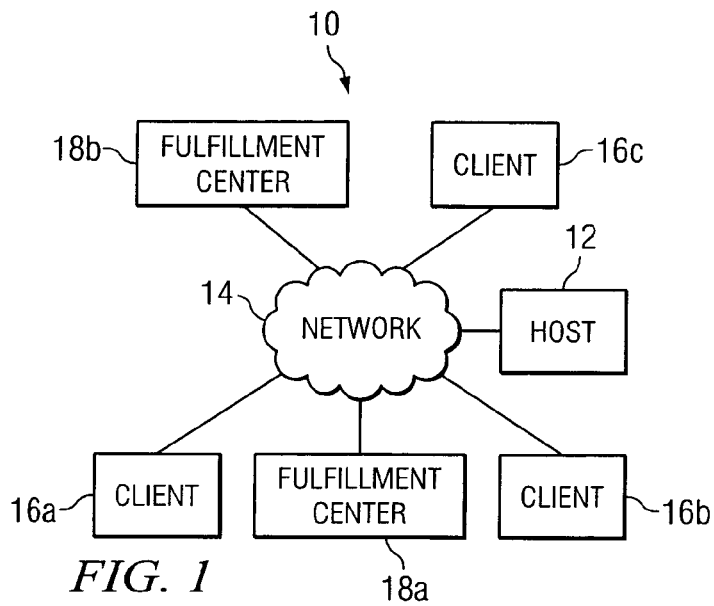
FIG. 1 illustrates a system for providing audiovisual works in accordance with the present invention.

FIG. 1 illustrates a system, indicated generally at 10, that includes a host 12, a communications network 14, multiple clients 16, and multiple fulfillment centers 18. Clients 16 interact with host 12 through network 14 to request audiovisual works, which may be distributed by fulfillment centers 18. According to particular embodiments, host 12 in conjunction with fulfillment centers 18 delivers audiovisual works to clients 16 according to characteristics of audiovisual works. Audiovisual works and/or categories of audiovisual works may be created and/or selected by clients 16. Alternatively or in addition, host 12 may suggest or automatically select audiovisual works and/or categories of audiovisual works based on various factors.

Host 12 represents an entity, such as a person, a group of persons, and/or any appropriate hardware and controlling logic, capable of delivering and/or arranging delivery of audiovisual works to clients 16. In some embodiments, host 12 may include a Web server capable of hosting a computerized Web page that transmits and receives information through network 14. In alternative embodiments, host 12 may include a traditional telephone, personal computer, or any other appropriate device able to communicate with clients 16 and fulfillment centers 18 through network 14. For example, host 12 may receive requests for delivery of audiovisual works from clients 16 through network 14. Host 12 may generate various lists of audiovisual works and/or organize lists of audiovisual works by categories; determine which audiovisual works to deliver to clients 16 according to various algorithms; and communicate with fulfillment centers 18 to organize delivery of audiovisual works to clients 16.

Network 14 represents any suitable collection of hardware, software, and controlling logic to interconnect elements coupled to network 14. Thus, network 14 provides an infrastructure to support communications within system 10. In a particular embodiment, network 14 may include one or multiple networks, such as a telecommunications network, a satellite network, a cable network, a local area network (LAN), a wide area network (WAN), the Internet, and/or any other appropriate networks.

Clients 16 each represent an entity, such as a person, a group of persons, and/or any appropriate hardware and controlling logic, capable of requesting and/or receiving audiovisual works from host 12. In some embodiments, clients 16 may include Web browsers capable of accessing a computerized Web page to transmit and receive information through network 14. In alternative embodiments, clients 16 may include traditional telephones, personal computers, or any other appropriate device able to communicate with host 12 through network 14. For example, clients 16 may transmit requests for delivery of audiovisual works to host 12 through network 14.

Fulfillment centers 18 each represent an entity, such as a person, a group of persons, and/or any appropriate hardware and controlling logic, capable of fulfilling requests or invoices for audiovisual works. In some embodiments, fulfillment centers 18 may include technology capable of transmitting and receiving information through network 14, for example traditional telephones, personal computers, or any other appropriate devices. Furthermore, fulfillment centers 18 may include warehouses, central distributions facilities, and/or traditional brick-and-mortar audiovisual retail shops that may store audiovisual works for delivery to clients 16.

In operation, host 12 may interact with clients 16 and/or fulfillment centers 18 through network 14 to arrange for delivery of audiovisual works to clients 16. As used herein, an audiovisual work represents any material operable to communicate audio and/or visual information. In some embodiments, audiovisual works may include movies, video games, music, books, recorded books, and/or any other specific type or types of material operable to communicate audio and/or visual information. Thus, for example, host 12 may include a Web site and/or telephone operators that accept requests for deliveries of movies to clients 16.

Host 12 may generate a client list that identifies audiovisual works client 16 desires to be delivered to client 16. Generating client lists may take many forms. Clients 16 may select audiovisual works to include on and/or exclude from client lists. For example, clients 16 may manually select audiovisual works from a library of audiovisual works stored by host 12. Similarly, host 12 may recommend audiovisual works to particular clients 16 according to various factors such as availability and popularity of particular audiovisual works and the inventory history associated with the particular client 16. Clients 16 may then select from the recommended works. Alternatively or in addition, host 12 may automatically generate lists of audiovisual works to deliver to clients 16.

To assist clients 16 in selecting audiovisual works to add to client lists, host 12 may generate lists of suggested or recommended audiovisual works based on information obtained from clients 16. For example, host 12 may request clients 16 to rate multiple genres of audiovisual works. In one embodiment, clients 16 may rate each genre by selecting from one to five stars to indicate personal preferences of each genre. Host 12 may use the provided information to generate individualized recommended lists of audiovisual works that reflect the preferences expressed by clients 16.

Host 12 may use various algorithms and may consider various factors when generating the recommended list. Besides preferences of clients 16, for example, host 12 may use availability information to limit recommendations to available audiovisual works. Availability information may be based on a requirement that a particular number of audiovisual works be in stock in fulfillment centers 18 before the audiovisual work will be included in a recommended list. Furthermore, each iteration of the algorithm may return different audiovisual works to ensure that inventories of audiovisual works are not depleted. Host 12 may also ensure that a particular ratio of well-known audiovisual works versus lesser-known audiovisual works are included in the recommended list using a configurable ratio input into the algorithm. In addition, host 12 may filter the recommended list to prevent presentation of audiovisual works client 16 has already received, or works that client 16 received during some immediately preceding period of time, such as within the past six months. The filtering may be based on account information stored by host 12 concerning the particular client 16 requesting the recommended list, and/or may be based on feedback provided by the particular client 16 when presented with the individualized recommended list. Once the recommended list is generated, clients 16 may select audiovisual works from the recommended lists to add audiovisual works to client lists.

Alternatively or in addition, host 12 may automatically generate lists of audiovisual works to use when clients 16 activate an automatic selection feature. By selecting the automatic selection feature, client 16 indicates willingness to automatically receive audiovisual works from a list generated by host 12. The automatically generated list may include audiovisual works identified by host 12 that client 16 may find desirable based on ratings of genres. Similar to the feature described above with regard to recommending audiovisual works for selection by clients 16, host 12 may request clients 16 to rate multiple genres of audiovisual works. In one embodiment, clients 16 may rate each genre by selecting from one to five stars to indicate personal preferences of each genre. Host 12 may use the provided information to automatically generate and use a list of audiovisual works that reflects the preferences expressed by clients 16.

Host 12 may use various algorithms and may consider various factors when automatically generating a list of audiovisual works to deliver to clients 16. For example, in one embodiment, all audiovisual works may be divided into multiple divisions reflecting factors such as availability and popularity. Thus, for example, audiovisual works may be divided into two divisions, a first division and a second division. Assignment of audiovisual works to divisions may be stored in an audiovisual library. Furthermore, to reduce server load, assignment may be performed periodically, such as every day. Based on the preferences indicated by client 16, appropriate percentages for each division and for each genre may be calculated. Then, audiovisual titles from each division and genre may be identified using the percentages. To reduce repetitious selection of particular audiovisual works, host 12 may mix results and/or serially return audiovisual works from each division. Furthermore, host 12 may utilize a filter to include or exclude specific audiovisual works and/or types of audiovisual works based on predefined indications received from client 16. Thus, host 12 may use different factors and algorithms to automatically generate lists of audiovisual works to deliver to clients 16 versus the factors and algorithms used to generate recommended lists of audiovisual works for clients 16 to select. However, note that the factors and algorithms may instead be similar or the same.

To further assist host 12 in determining which audiovisual works to deliver to clients 16, host 12 and/or clients 16 may organize audiovisual works into categories. Each category may group a set of audiovisual works using a common characteristic. Furthermore, in some embodiments filters may be used to include or exclude audiovisual works from categories. For example, for movies, appropriate categories may include particular genres, actors, producers, directors, release dates, or ratings. Thus, in a particular embodiment, a category may include comedies. For other audiovisual works, similar or different categories may be used as appropriate. Furthermore, as mentioned, host 12 may allow clients 16 to generate categories of audiovisual works. As such, each category might include audiovisual works selected by client 16 that may or may not be related in any obvious way other than the fact that client 16 assigned the audiovisual works to the same category. Thus, for example, in a particular embodiment client 16 may generate three categories of audiovisual works, where each category is associated with a family member in a household. Each household member may select audiovisual works and include his or her audiovisual works in his or her respective category. Thus, host 12 may allow categorization of client lists.

To make use of the categories created or selected, client 12 may assign one or more categories to a delivery slot maintained by host 12. In this way, client 12 may create, and host 12 may maintain, categorization rules for use when determining an audiovisual work to deliver to client 16. Categorization rules represent restrictions placed on host 12 that, at appropriate times, cause host 12 to attempt to deliver audiovisual works to client 16 that are from one or more selected categories. Delivery slots identify one or more categories of audiovisual works from which an audiovisual work may be selected and delivered to clients 16. Thus, before host 12 selects an audiovisual work from a client list associated with a client 12 that has the categorization feature activated, host 12 may be required to determine which categories from which an audiovisual work may be selected for delivery to client 16. In this way, client 16 may maintain a predefined inventory of audiovisual works. Note that while explained with regard to one delivery slot, categorization rules may be used with multiple delivery slots.

As yet another way to assist host 12 in determining which audiovisual works to deliver to clients 16, clients 16 and/or host 12 may rank audiovisual works in a particular order. For example, audiovisual works in client lists may be placed in a particular order selected by clients 16. Alternatively or in addition, clients 16 may organize and order audiovisual works within each selected category within a client list. By ordering the audiovisual works, host 12 may be instructed as to which audiovisual works should, if possible or appropriate, be delivered to a particular client 16.

Audiovisual works may be delivered to client 16 at various times. For example, host 12 may schedule delivery of audiovisual works upon subscription to a service provided by host 12. Delivery may also occur in response to returns of audiovisual works. Delivery of audiovisual works may be conducted by host 12 alone or in combination with fulfillment centers 18. For example, DVDs, videos, CDs, video games, or other appropriate physical embodiments of audiovisual works may be sent to client 16 by host 12 and/or fulfillment centers 18. For example, the audiovisual works may be mailed. In other embodiments, electronic embodiments of audiovisual works may be communicated, for example, through network 14. Thus, according to particular embodiments, a return of an audiovisual work may include the physical return of a physical copy of the audiovisual work or an electronic or other communication or indication that client 16 has completed use of the audiovisual work.

Host 12 may consult with a client list associated with client 16 to determine which audiovisual work or works to provision for delivery to client 16. When client 16 participates in a subscription plan, a particular number of audiovisual works may be requested by client 16 at any one time. Thus, host 12 may determine an available number of audiovisual works for client 16 to receive and select that number of audiovisual works from the client list associated with client 16. The selection of audiovisual works to deliver may involve an algorithm involving the order and availability of audiovisual works included in the client list. When client 16 chooses to associate categories with delivery slots, audiovisual works from categories associated with each delivery slot may be delivered to client 16.

Upon return of a delivered audiovisual work, host 12 may determine whether to provide another audiovisual work to client 16. According to particular embodiments, host 12 may identify audiovisual works for delivery to client 16 based upon characteristics of audiovisual works returned by client 16. When client 16 participates in a subscription plan, host 12 may identify an audiovisual work from the client list associated with client 16 to provide to client 16. As discussed above, host 12 may consider various factors when making this determination. For example, host 12 may identify a characteristic of the returned audiovisual work. Using the characteristic, host 12 may identify a delivery slot associated with the returned movie. Then, host 12 may select and deliver an audiovisual work from a category associated with the same delivery slot. In this way, client 16 may continuously maintain an inventory of audiovisual works from various categories associated with delivery slots.

Other factors host 12 may consider in determining which audiovisual work to delivery after receiving a returned audiovisual work include availability of particular audiovisual works, an order of audiovisual works selected by client 16, qualities of movies as identified, for example, by critics, or any other appropriate techniques. Host 12 may also filter a list of audiovisual works for audiovisual works previously delivered, rented, and/or otherwise obtained by client 16. However, a filter for previously obtained items may include a time limit so that popular audiovisual works may be delivered multiple times.

For purposes of explanation, consider a particular client 16 that desires to maintain a particular inventory of movies. For example, assume client 16 desires to maintain an inventory of three movies, where one is a comedy, one is a movie in which the actor Tom Cruise acted, and one is either a horror movie or a war movie. Host 12 may associate categories with delivery slots. A first delivery slot may be associated with the category of the genre comedy. A second delivery slot may be associated with the category of movies in which Tom Cruise acts. A third delivery slot may be associated with the categories of the genres horror and war. When a movie is returned to host 12, host 12 may, for example, determine that the movie is a comedy. Since the movie is a comedy, host 12 may determine that the first delivery slot is now open. Thus, host 12 may select an audiovisual work from the category of comedy, which is associated with the first delivery slot, to deliver to client 16. In this way, client 16 may maintain a predefined inventory of movies at practically all times. Note that when returned movies may have characteristics associated with multiple delivery slots, host 12 may analyze various other information such as inventory history of client 16 to attempt to determine which delivery slot should be used. Furthermore, note that the preceding example is used for illustrative purposes only, and the techniques described herein may be used in various ways to provide various types of audiovisual works to clients 16.

Thus, system 10 enables the selection and delivery of audiovisual works using a client list that may be generated in various ways. Furthermore, system 10 provides for maintaining an inventory of audiovisual works associated with predefined categories.

Figure 2:
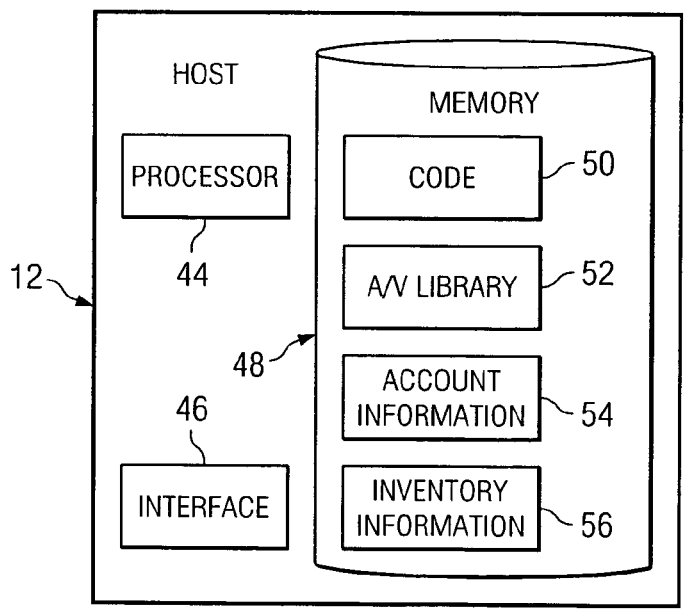
FIG. 2 is a block diagram illustrating functional components of a host for the system.

FIG. 2 is a block diagram illustrating functional components of a particular embodiment of host 12. In general, host 12 communicates with clients 16 and fulfillment centers 18 to identify and arrange delivery of audiovisual works to clients 16. More specifically, host 12 may be used to delivery audiovisual works to clients 16 based on characteristics of returned audiovisual works, categories of audiovisual works, and delivery slots. In the embodiment illustrated, host 12 includes a processor 44, an interface 46, and a memory 48.

Processor 44 controls the operation and administration of elements within host 12. For example, processor 44 operates to process information and/or commands received from interface 46 and memory 48. Processor 44 includes any hardware and/or logic elements operable to control and process information. For example, processor 44 may be a microcontroller, processor, programmable logic device and/or any other suitable processing device. As discussed above, in some embodiments host 12 may operate to host a Web page on the Internet.

Interface 46 communicates information to and receives information from network 14. For example, interface 46 may communicate through network 14 to clients 16 and/or fulfillment centers 18. When communicating with clients 16, interface 46 may transmit and receive information regarding audiovisual works, such as instructions to include audiovisual works in particular client lists and/or categories. When communicating with fulfillment centers 18, interface 46 may transmit or receive information related to delivery of audiovisual works. For example, fulfillment centers 18 may communicate information related to availability of particular audiovisual works. Thus, interface 46 represents any suitable hardware or controlling logic used to communicate information to or from elements linked to host 12.

Memory 48 stores, either permanently or temporarily, data and other information, such as information for processing by processor 44 and transmission by interface 46. Memory 48 represents any one or a combination of volatile or nonvolatile local or remote devices suitable for storing information. For example, memory 48 may include random access memory (RAM), read only memory (ROM), magnetic storage devices, optical storage devices, or any other suitable information storage device or combination of these devices. Memory 48 may store information in one or more modules. For example, in the embodiment illustrated, memory 48 maintains code 50, audiovisual library 52, account information 54, and inventory information 56. However, while memory 48 as illustrated includes particular data elements, it should be understood that memory 48 may maintain any suitable information for use in operation of host 12.

Code 50 includes software, executable files, Web pages, and/or appropriate logic modules capable when executed to control the operation of host 12. For example, code 50 may include Web pages capable of receiving requests from clients 16 for host 12 to deliver audiovisual works. In addition, code 50 may include algorithms capable of determining audiovisual works to delivery to clients 16. Code 50 may also include executable files capable of communicating delivery requests with fulfillment centers 18.

Audiovisual library 52 includes information related to audiovisual works. For example, audiovisual library 52 may include titles and summaries of audiovisual works. In addition, audiovisual library 52 may include other information related to audiovisual works, such as actors, producers, directors, release dates, and other appropriate information. Audiovisual library 52 may be organized in various manners, including groupings of audiovisual works by genre and/or other categories.

Account information 54 includes information related to particular clients 16. For example, account information 54 may include client lists indicating audiovisual works selected by clients 16. Any particular client list may be organized or divided into categories, such as by genre of audiovisual works or by individual people associated with particular audiovisual works. Account information may also include information related to delivery slots. Each client 16 may be associated with one or more delivery slots. Delivery slots identify one or more categories of audiovisual works from which an audiovisual work may be selected and delivered to clients 16. In addition, account information 54 may include information related to a subscription plan, such as a total number of delivery slots associated with client 16. Account information 54 may also include payment information and other appropriate information related to clients 16. Furthermore, account information 54 may include inventory histories of clients 16. Each inventory history identifies audiovisual works already obtained by a particular client 16.

Inventory information 56 includes information related to availability of audiovisual works. For example, inventory information 56 may associate titles with available quantities of audiovisual works held by one or more fulfillment centers 18. Inventory information 56 may be dynamically determined, such as in real time. Furthermore, inventory information 56 may be local or remote information. For example, host 12 may be operable to communicate with remote fulfillment centers 18 through network 14 to obtain inventory information 56. Thus, inventory information 56 may be based upon actual inventories. Alternatively or in addition, inventory information 56 may be based upon projections and forecasts of future inventories.

In operation, processor 44 executes instructions found in code 50 to support identification and provision of audiovisual works. For example, processor 44 may execute software stored in code 50 to host a Web site for use by clients 16. Interface 46 may transmit and receive information communicated between host 12 and network 14. Thus, clients 16 may interact with a Web site hosted in memory 48 to access audiovisual library 52 to select audiovisual works for inclusion in client lists stored in account information 54. Alternatively or in addition, processor 44 may execute instructions stored in code 50 to generate recommended lists identifying recommended audiovisual works for inclusion in client lists. Clients 16 may select audiovisual works identified in the recommended lists for inclusion in client lists. Furthermore, processor 44 may execute instructions stored in code 50 to identify audiovisual works for automatic inclusion in client lists.

Processor 44 may execute instructions in code 50 to identify audiovisual works listed in client lists stored in memory 48 for delivery to clients 16. As discussed above, various algorithms and factors may be utilized. For example, when audiovisual works are returned to fulfillment centers 18, processor 44 may be notified using messages communicated to interface 46. When a particular client 16 utilizes categories, processor 44 may identify a characteristic of the returned audiovisual work, associate the returned audiovisual work with a delivery slot, identify one or more categories associated with the identified delivery slot, and select another audiovisual work from one of the identified categories to be delivered to client 16. Processor 44 may send a communication through interface 46 to fulfillment centers 18 to send the particular audiovisual work to client 16.

Figure 3:
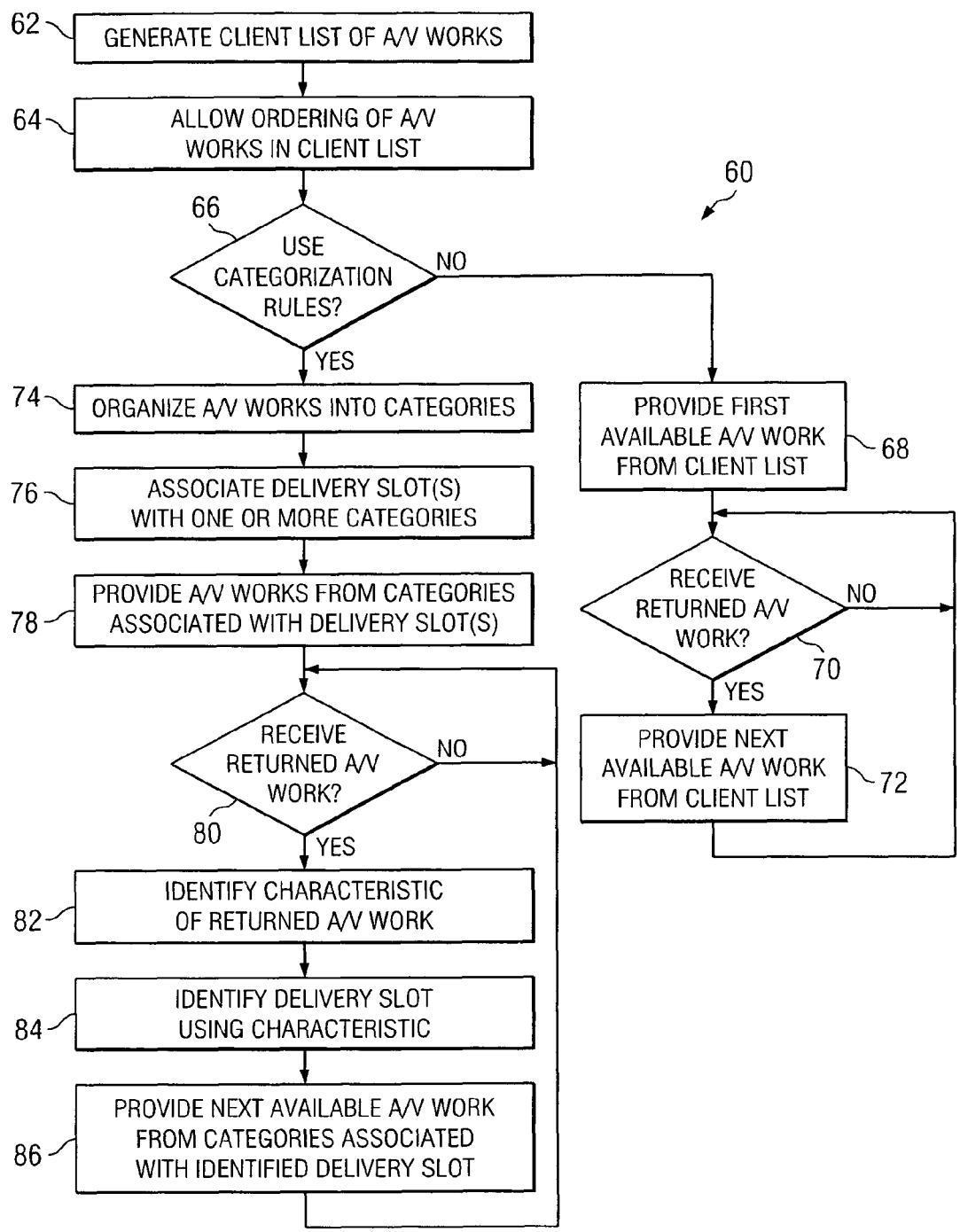
FIG. 3 is a flowchart illustrating a method for providing audiovisual works to a client.

FIG. 3 illustrates a method 60 for providing audiovisual works to clients 16. A client list is generated at step 62 that identifies a number of audiovisual works. The client list may be generated in multiple ways. For example, client 16 may browse audiovisual library 52 and make selections from listed audiovisual works. Alternatively or in addition, host 12 may generate a recommended list of audiovisual works and client 16 may make selections from the recommended list. Still another way of generating the client list may include automatically generating a list of audiovisual works using various factors such as preferences for and availability and popularity of audiovisual works.

Client 16 is allowed to order the audiovisual works in the client list at step 64. For example, client 16 may desire to obtain certain audiovisual works more than other audiovisual works, and the client list may be ordered to reflect this. Furthermore, client 16 may desire to obtain certain audiovisual works in a particular order. For example, in the case of movies, client 16 may desire only to watch a sequel after watching the original movie. Similarly, in the case of a television series, client 16 may desire only to watch a particular show or season of shows after watching a previously released show or series.

A determination is made whether to use categorization rules at step 66. For example, client 16 may indicate to host 12 whether to use categorization rules. Categorization rules represent restrictions placed on host 12 that cause host 12 to attempt to deliver audiovisual works to client 16 that are from one or more categories. In some embodiments, client 16 selects the categories and associates categories with delivery slots. Thus, categorization rules attempt to maintain a particular inventory of audiovisual works at client 16 by controlling what audiovisual works are delivered by host 12.

If categorization rules are not used, a first available audiovisual work is provided to client 16 from the client list at step 68. For example, host 12 may compare audiovisual works included in the client list in the order specified by client 16 with inventories of fulfillment centers 18. A first audiovisual work found to be available may be provided to client 16. As discussed above, delivery of the audiovisual work may take many forms. For example, the audiovisual work may be mailed, couriered, or electronically communicated to client 16. At step 70 host 12 determines whether an audiovisual work has been returned. Once an audiovisual work has been returned, a next available audiovisual work from the client list is identified and provided to client 16 at step 72.

Now returning to step 66, if a determination is made to use categorization rules, host 12 organizes the audiovisual works identified in the client list into categories at step 74. As described above, the categories may be created and maintained by host 12 and/or created and maintained by client 16. For example, client 16 may choose predetermined categories presented by host 12. For movies, example categories may include horror, comedy, action/adventure, family, or any other appropriate genres. Alternatively or in addition, categories for movies may include names of actors, directors, producers, release dates, or any other appropriate category. Furthermore, categories may include movies selected by different people.

At step 76, host 12 associates a delivery slot with one or more categories of audiovisual works. As discussed above, delivery slots identify one or more categories of audiovisual works from which an audiovisual work may be selected and delivered to clients 16. Thus, according to particular embodiments, client 16 communicates to host 12 which categories client 16 wishes to associate with a particular delivery slot. Note that multiple delivery slots may be associated with categories. For example, if client 16 wishes to maintain an inventory of three audiovisual works, three delivery slots may be configured.

Host 12 and/or fulfillment centers 18 provide audiovisual works to client 16 from the categories associated with the delivery slots at step 78. For example, host 12 or fulfillment centers 18 may mail audiovisual works to client 16. Audiovisual works may be selected from categories associated with delivery slots using various factors, such as popularity, availability, inventory history associated with client 16, and/or any other appropriate factors. Furthermore, the number of audiovisual works provided to client 16 may be limited to an overall number of audiovisual works and/or a number of audiovisual works per delivery slot, such as one.

At step 80, host 12 determines whether audiovisual works have been returned. When an audiovisual work has been returned, host 12 may identify a characteristic of the returned audiovisual work at step 82. For example, host 12 may determine that a returned video game includes a particular rating or a music CD is of a particular genre. Furthermore, host 12 may identify a particular client 16 that returned the audiovisual work. At step 84, host 12 identifies a delivery slot based on the determined characteristic or characteristics. For example, host 12 may identify that the returned video game having the particular rating is associated with a particular delivery slot, since the delivery slot is associated with video games of the same ratings classification. Similarly, host 12 may identify a particular delivery slot associated with the returned music CD based on the genre of the returned music CD.

Host 12 may provide a next available audiovisual work from the category or categories associated with the identified delivery slot at step 86. For example, if a horror movie is returned, a next available horror movie on the client list may be provided to client 16 if horror is a category associated with the identified delivery slot. Similarly, if the categories correspond to individuals in a household and an audiovisual work associated with one person is returned, a next available audiovisual work associated with that person may be provided to the household.

Thus, method 60 illustrates one example of providing audiovisual works to clients 16. By using categorization rules, client 16 may maintain a certain number of audiovisual works associated with particular categories at practically any given time.

Figure 4:
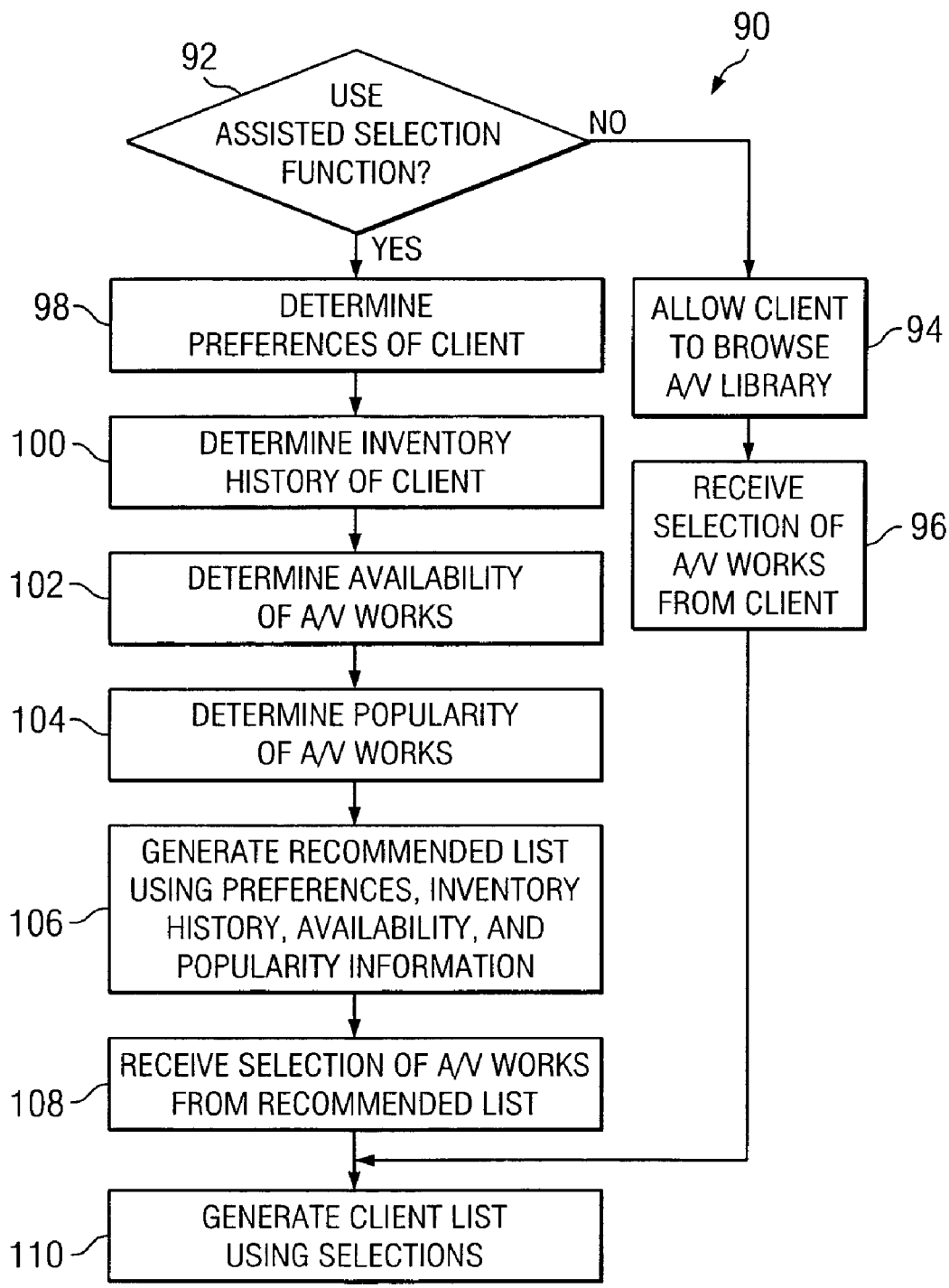
FIG. 4 is a flowchart illustrating a method for generating a list of recommended audiovisual works for presentation to a client.

FIG. 4 illustrates a method 90 for generating the client list. The particular method illustrated is described below with respect to the operation of host 12. However, the present method may be performed by one or more other elements from system 10 alone or in combination with host 12. For example, when appropriate, clients 16 and/or fulfillment centers 18 may perform the described operation.

Host 12 determines at step 92 whether to use an assisted selection function. When the assisted selected function is not used, host 12 allows client 16 to browse audiovisual library 52 at step 94. Host 12 receives selections of audiovisual works from client 16 at step 96. Using the selections, host 12 generates the client list at step 110.

Returning to step 92, if host 12 determines to use the assisted selection function, host 12 determines client preferences at step 98. In some embodiments, client 16 may communicate preferences by rating genres of audiovisual works. Host 12 determines the inventory history of client 16 at step 100. The inventory history may indicate dates particular audiovisual works were last obtained by client 16. Host 12 determines the availability of audiovisual works at step 102. For example, host 12 may identify inventories of fulfillment centers 18. Thus, determining availability may include communicating with fulfillment centers 18 and/or analyzing inventory information 56 to determine specific audiovisual works available to be provided to client 16. Host 12 determines popularity of audiovisual works at step 104. For example, ratings of audiovisual works by critics and/or popularity of audiovisual works among renters, subscribers, and/or other individuals may be used to identify highly sought audiovisual works. Host 12 generates a recommended list of audiovisual works using the preferences, inventory history, availability, and popularity of audiovisual works at step 106. Various algorithms stored in code 50 may be used. Furthermore, host 12 may display the recommended list to client 16.

At step 108, host 12 receives a selection of audiovisual works from the recommended list. Client 16 may pick and choose audiovisual works from the recommended list or accept the recommended list in whole. Host 12 generates the client list using the received selections at step 110.

Thus, method 90 illustrates one manner of generating the client list. The client list may be used by host 12 to identify and select audiovisual works to deliver to clients at any time, such as upon receiving a returned audiovisual work.

Figure 5:
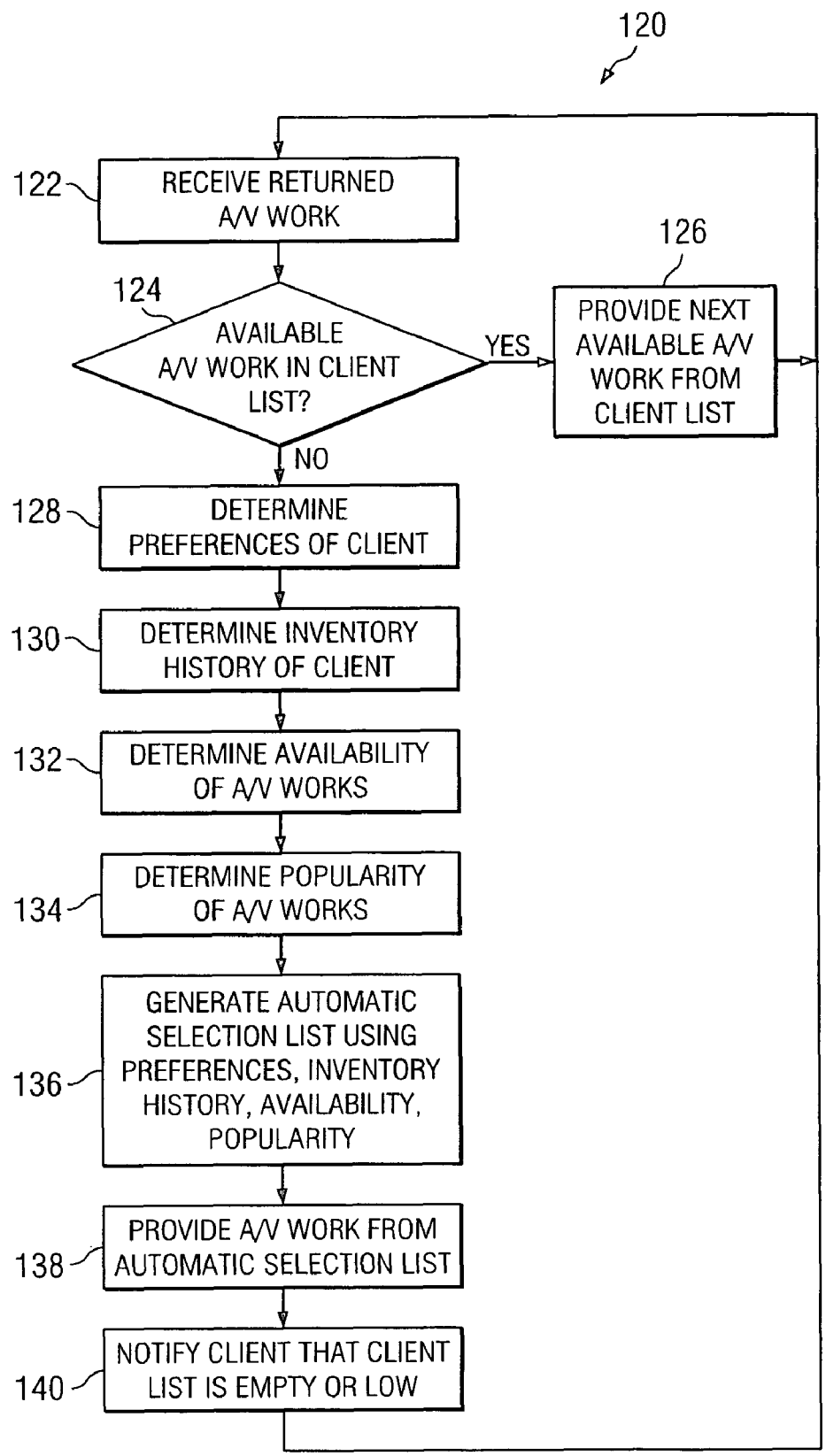
FIG. 5 is a flowchart illustrating a method for providing audiovisual works to a client using an automatically generated list of audiovisual works.

FIG. 5 illustrates a method 120 for automatically selecting an audiovisual work to deliver to client 16. Again, the particular method illustrated is described below with respect to the operation of host 12. However, the present method may be performed by one or more other elements from system 10 alone or in combination with host 12. For example, when appropriate, clients 16 and/or fulfillment centers 18 may perform the described operation.

Host 12 and/or fulfillment centers 18 receive a returned audiovisual work at step 122. Host 12 determines whether an available audiovisual work is identified in the client list at step 124. When the client list does identify an available audiovisual work, host 12 arranges for delivery of a next available audiovisual work in the client list at step 126.

On the other hand, if the client list does not identify any available audiovisual works, host 12 determines client preferences at step 128. As discussed above, in some embodiments, client 16 may communicate preferences by rating genres of audiovisual works. Host 12 determines the inventory history of client 16 at step 130. Again, as discussed above, the inventory history may indicate dates particular audiovisual works were last obtained by client 16. Host 12 determines the availability of audiovisual works at step 132. For example, inventories of fulfillment centers 18 may be identified. Thus, determining availability may include host 12 communicating with fulfillment centers 18 and/or analyzing inventory information 56 to determine specific audiovisual works available to be provided to client 16. Host 12 determines the popularity of the audiovisual works at step 134. For example, as discussed above, ratings of audiovisual works by critics and/or popularity of audiovisual works among renters, subscribers, and/or other individuals may be used by host 12 to identify highly sought audiovisual works. Host 12 generates an automatic selection list of audiovisual works using the preferences, inventory history, availability, and popularity of audiovisual works at step 136. Various algorithms stored in code 50 may be used to fulfill this step.

Host 12 and/or fulfillment centers 18 provide an audiovisual work selected from the automatic selection list at step 138. Furthermore, host 12 may notify client 16 that the client list is empty at step 140. The notification may request that client 16 select audiovisual works to include in the client list if client 16 desires to avoid host 12 automatically selecting audiovisual works. The notification may further include suggestions, promotions, and other appropriate information for use by client 16. According to particular embodiments, the notification may be in the form of an electronic message sent by host 12 through network 14.

Thus, method 120 illustrates one manner of automatically selecting an audiovisual work from the client list or an automatic selection list to deliver to client 16. Method 120 may enable client 16 to obtain audiovisual works without having to continuously replenish the client list.

The preceding flowcharts illustrate particular methods used to identify and provide audiovisual works. However, these flowcharts illustrate only exemplary methods of operation, and system 10 contemplates individuals and/or devices using any suitable techniques, elements, and applications for performing these functions. Thus, many of the steps in the flowcharts may take place simultaneously and/or in different orders than as shown. In addition, methods may include additional steps or fewer steps, so long as the methods remain appropriate. Moreover, one or more devices of system 10 may work independently and/or in conjunction with other elements of system 10 to identify and provide audiovisual works to clients.

Figure 6:
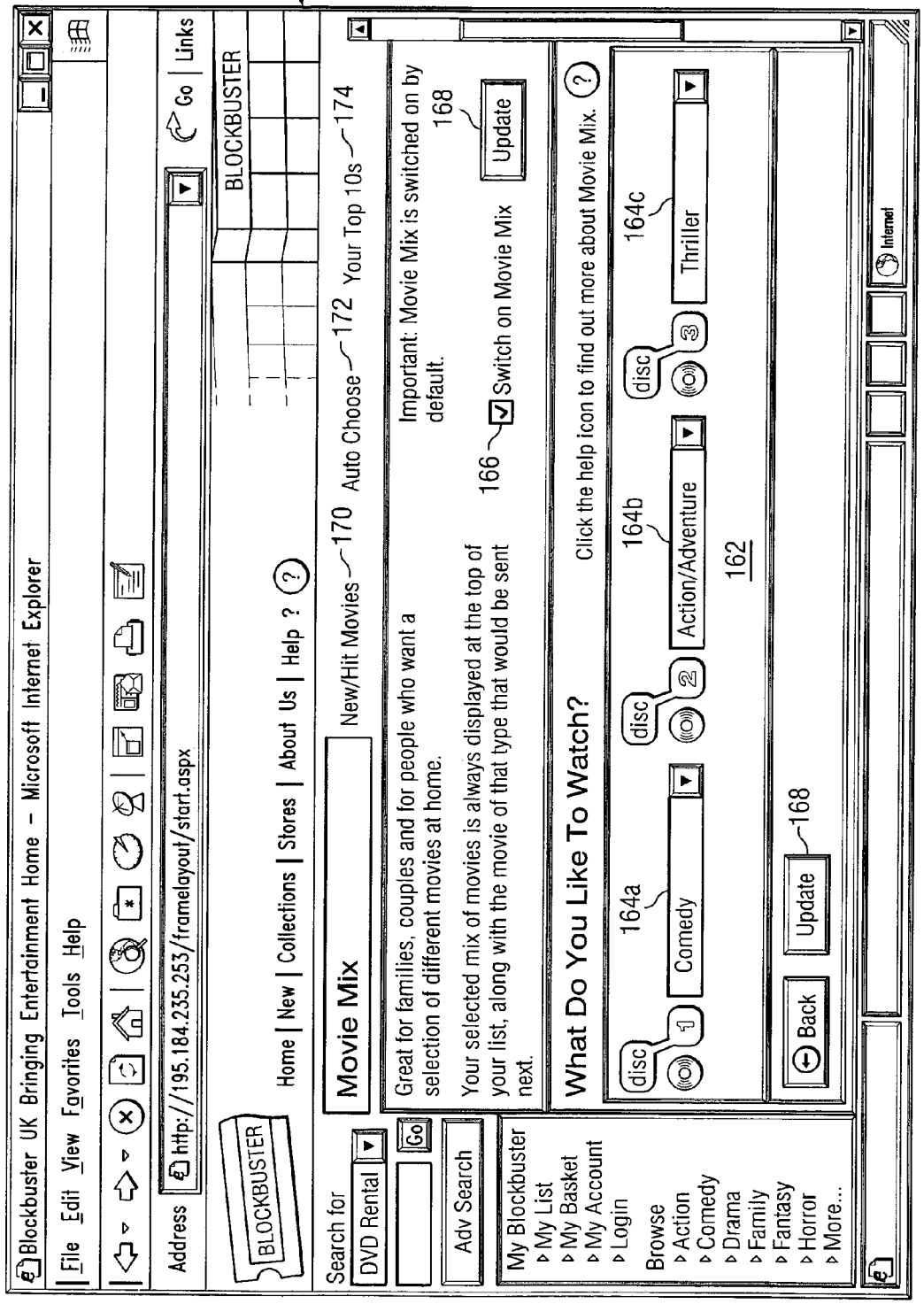
FIG. 6 illustrates a graphical user interface for generating categorization rules for use in providing audiovisual works to a client.

FIG. 6 illustrates a graphical user interface (GUI) 160 that graphically depicts a categorization feature. GUI 160 includes various features, such as links, buttons, and checkboxes, that together enable client 16 to view and input settings for categorization rules. As discussed above, categorization rules control what audiovisual works host 12 selects to deliver to clients 16. For example, categorization rules associate delivery slots with one or more categories of audiovisual works. When host 12 attempts to select and deliver an audiovisual work, for example, when an audiovisual work has been returned by client 16, host 12 may be required to comply with activated categorization rules. Thus, these rules may influence what audiovisual work host 12 may deliver to client 16.

GUI 160 includes a categorization rule section 162 that allows client 16 to select one or more predetermined categories using drop-down boxes 164. Drop-down boxes 164 therefore may be used to associate categories with delivery slots. For example, as illustrated, client 16 may select three genres of movies using drop-down boxes 164, such as comedy, action/adventure, and thriller. In the embodiment illustrated, therefore, three delivery slots have been created, where the first delivery slot is associated with the category of comedy, the second delivery slot is associated with the category of action/adventure, and the third delivery slot is associated with the category of thrillers. While GUI 160 shows only one genre being associated with each delivery slot, note that in some embodiments multiple categories may be associated with a delivery slot. Furthermore, in some embodiments, drop-down boxes 164 may allow client 16 to associate a delivery slot with any category.

Client 16 may check checkbox 166 to activate or deactivate use of the categorization rules. After client 16 adjusts drop-down boxes 164 and/or switch 166, client 16 may operate one of update buttons 168 to update account information 54 stored by host 12. In this way, account information 54 related to client 16 may be updated to reflect the selections made by client 16. By checking checkbox 166 and operating update button 168, client 16 may indicate a desire to receive movies from the categories indicated in drop-down boxes 164. Thereafter, when client 16 returns a movie to host 12 or fulfillment centers 18, host 12 may identify delivery slot associated with the returned movie, and therefore one or more categories associated with the identified delivery slot. Thereafter, host 12 may deliver another movie from one of the identified categories.

To change screens, client 16 may select "New/Hit Movies" link 170, "Auto Choose" link 172, or "Your Top 10s" link 174. Each of these links may direct client 16 to a subsequent Web page. For example, New/Hit Movies link 170 may direct client 16 to a Web page providing access to audiovisual library 52. Auto Choose link 172 may direct client 16 to a Web page associated with automatic selection of audiovisual works to include in a client list. Your Top 10s list 174 may direct client 16 to a Web page presenting a recommended list of audiovisual works from audiovisual library 52.

Figure 7A:
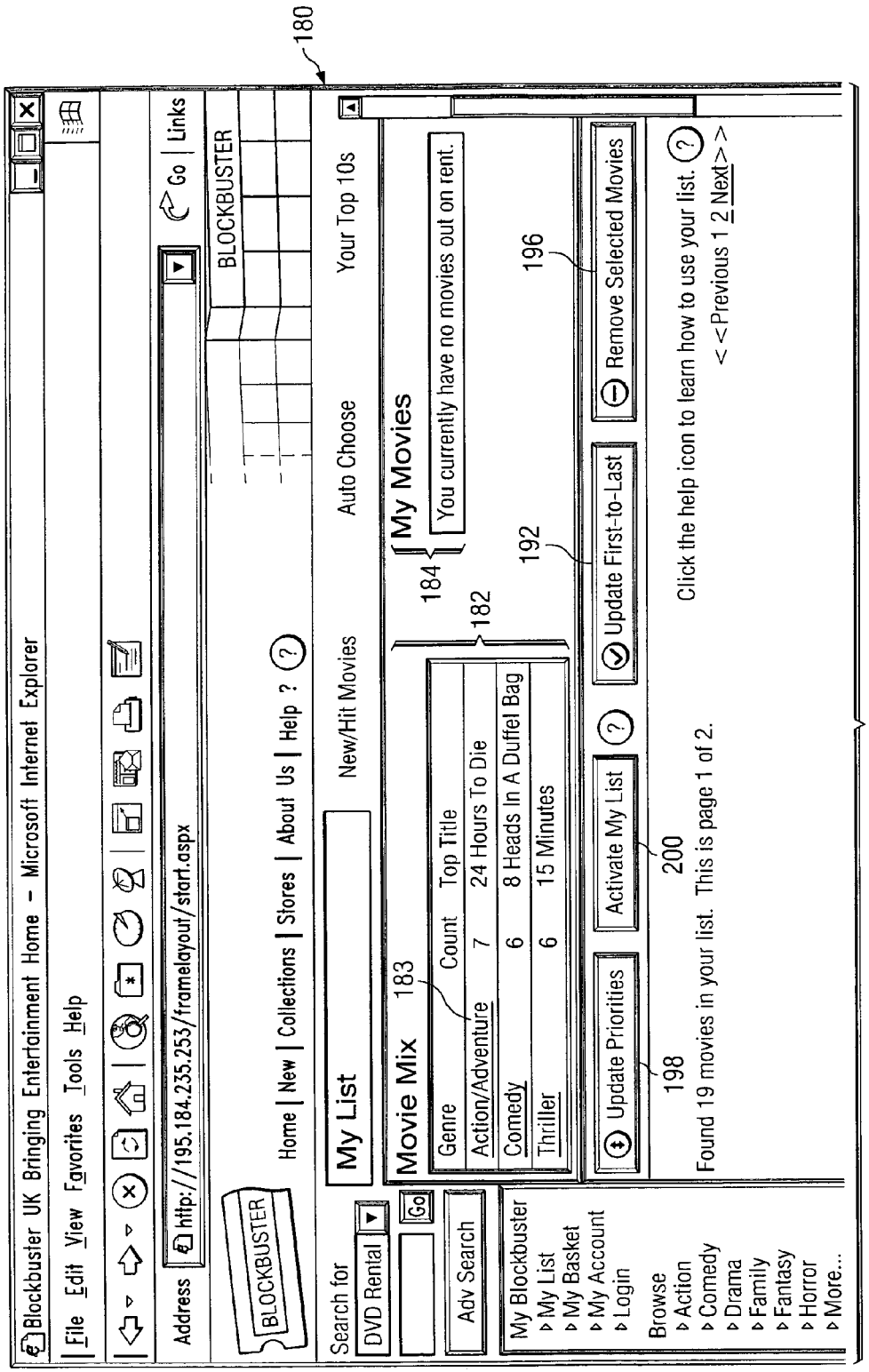
FIG. 7 illustrates a graphical user interface for selecting categories to organize a list of audiovisual works.
Figure 7B:

FIG. 7 illustrates a GUI 180 that graphically depicts a client list. GUI 180 includes various features, such as links, buttons, and checkboxes, that together enable client 16 to select and order audiovisual works into a custom client list.

GUI 180 includes multiple sections. "Movie Mix" section 182 summarizes settings for categorization rules. Movie Mix section 182 indicates three delivery slots, where each delivery slot is associated with one category. Furthermore, Movie Mix section 182 shows how many movies in the client list are included in each category, and a first listed audiovisual work within each category. The first listed audiovisual work will be the next audiovisual work from the respective category delivered to client 16 if client 16 activates the categorization feature in GUI 160 and that audiovisual work is available. Client 16 may filter the client list by category by selecting filtering links 183. Note that in this embodiment, Movie Mix section 182 indicates three delivery slots with each delivery slot associated with one category, where the categories correspond to movie genres. However, note that any number and type of categories may be associated with a delivery slot. "My Movies" section 184 indicates audiovisual works currently held by client 16. While none are listed in the illustrated embodiment, titles of audiovisual works may be listed when client 16 maintains a current inventory.

Below Movie Mix section 182 and My Movies section 184, the client list is represented by multiple audiovisual work sections 186. Each section 186 includes the order of a particular audiovisual work, a name and brief description of the audiovisual work, and various input/output devices. For example, ordering indicator 188*a* indicates the order of the particular audiovisual work in the client list. Up and down arrows 188*b* allow client 16 to reorder the audiovisual work in the client list. "First-to-Last" checkbox 190 allows client 16 to require that particular audiovisual works are delivered to client 16 in a fixed order. For example, particular movies, especially sequels, usually are watched in a particular order. Thus, First-to-Last checkbox 190 may be used to instruct host 12 to deliver audiovisual works such as sequels in a particular order, for example, regardless of availability. After selecting or deselecting First-to-Last checkboxes 190, to activate this feature client 16 may select "Update First-to-Last" button 192. In addition, client 16 may check "Select" checkbox 194 and "Remove Selected Movies" button 196 to remove selected audiovisual works from the client list.

After client 16 finalizes appropriate settings using any of these checkboxes, buttons, arrows, and other devices, client 16 may press "Activate My List" button 200. Selection of Activate My List button 200 indicates to host 12 that client 16 desires for host 12 to store the indicated settings and the client list into account information 54. Host 12 may then delivery audiovisual works to client 16 according to the settings and client list.

Figure 8A:
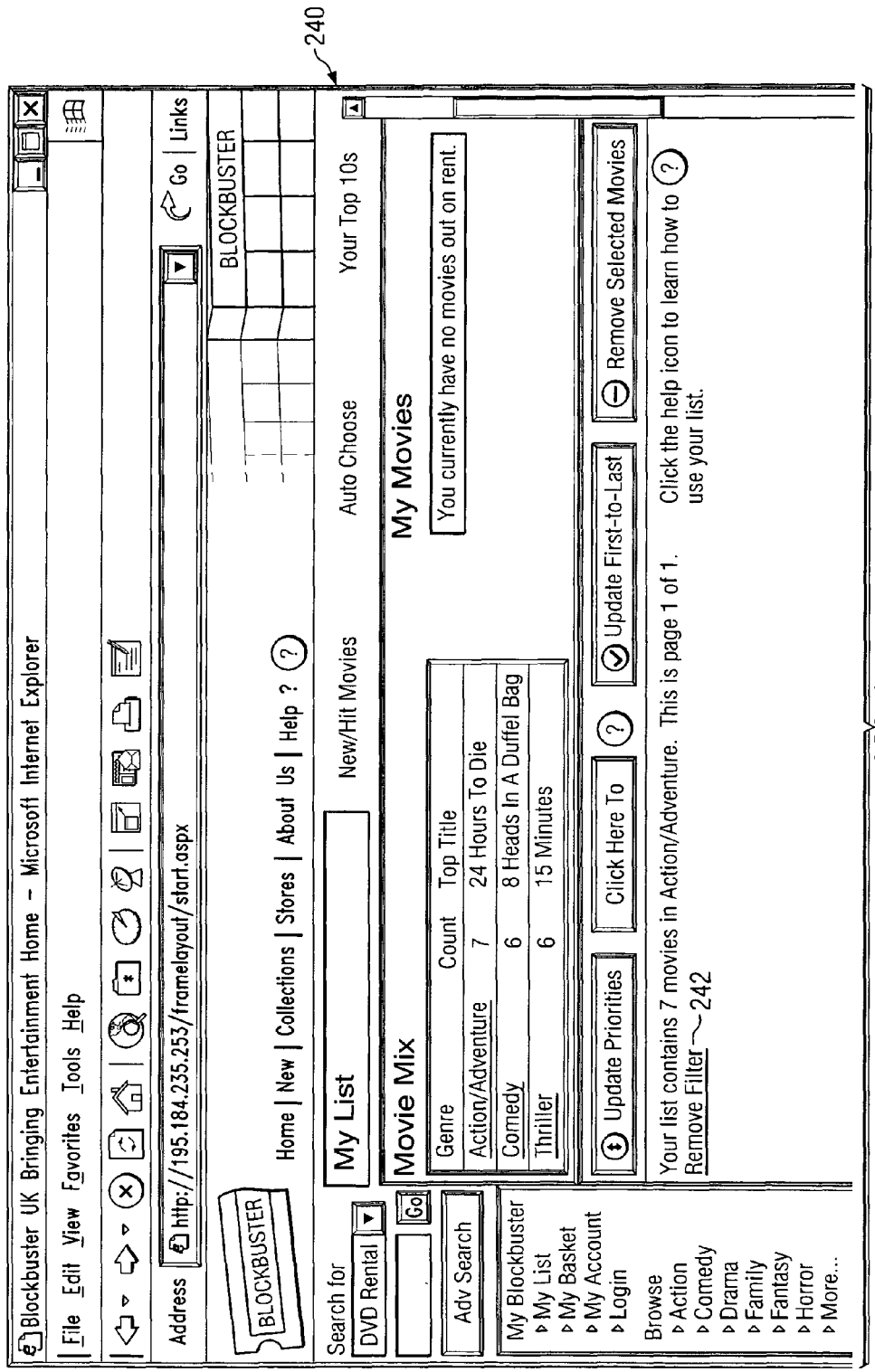
FIG. 8 illustrates a graphical user interface for filtering a list of audiovisual works into categories.
Figure 8B:
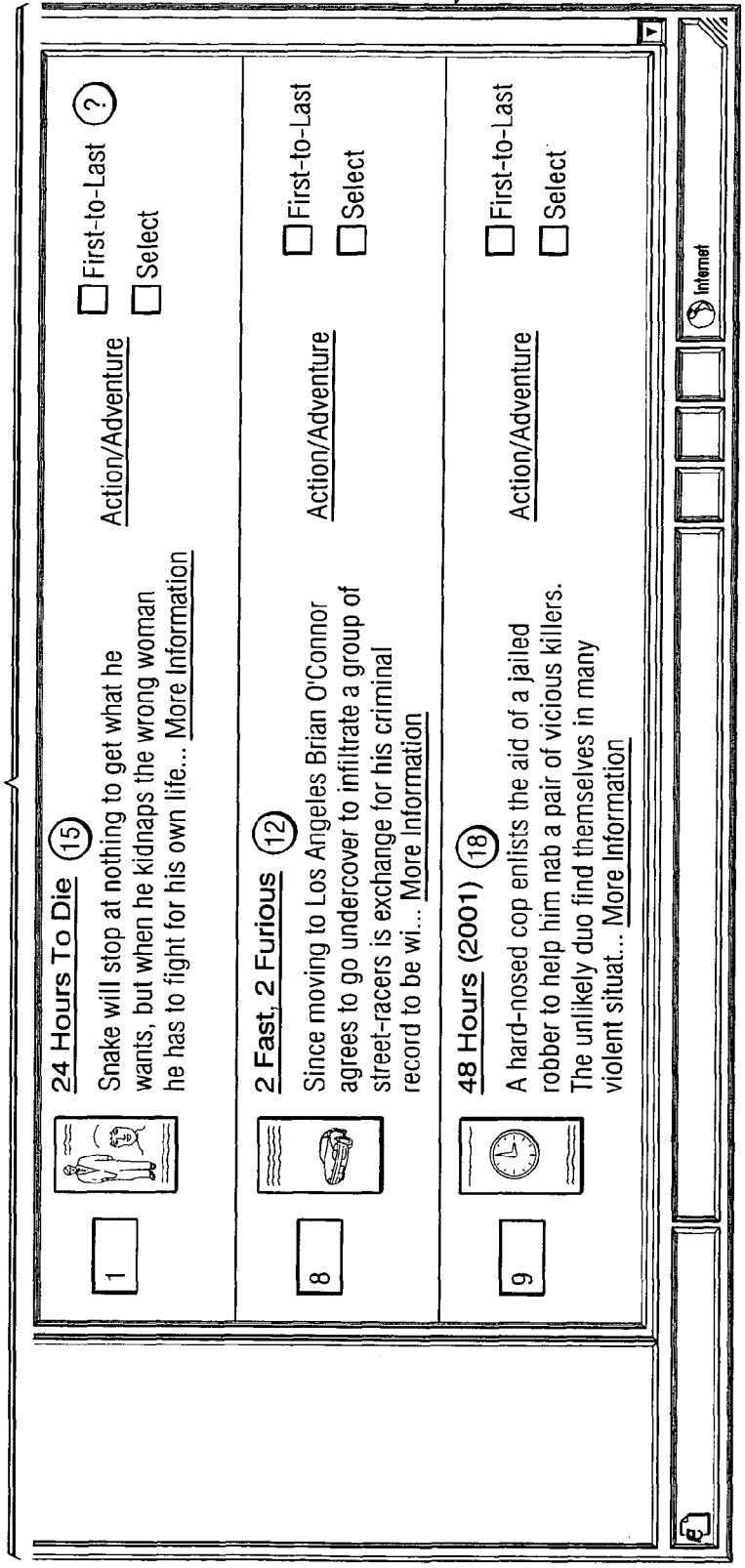

FIG. 8 illustrates a GUI 240 that graphically depicts a client list filtered by category. As illustrated, GUI 240 filters the client list according to movie genre. Similar to GUI 180, GUI 240 includes various features, such as links, buttons, and checkboxes, that together enable client 16 to select and order audiovisual works into a custom client list. In the embodiment illustrated, GUI 240 filters action/adventure movies from the client list. To remove filtration, client 16 may select "Remove Filter" link 242. While GUI 240 graphically depicts a client list filtered by category, various filtering may be helpful, such as filtering according to categorization rules. Furthermore, since only one category may be associated with each delivery slot, GUI 240 may simultaneously depict filtration according to categorization rules.

Figure 9A:
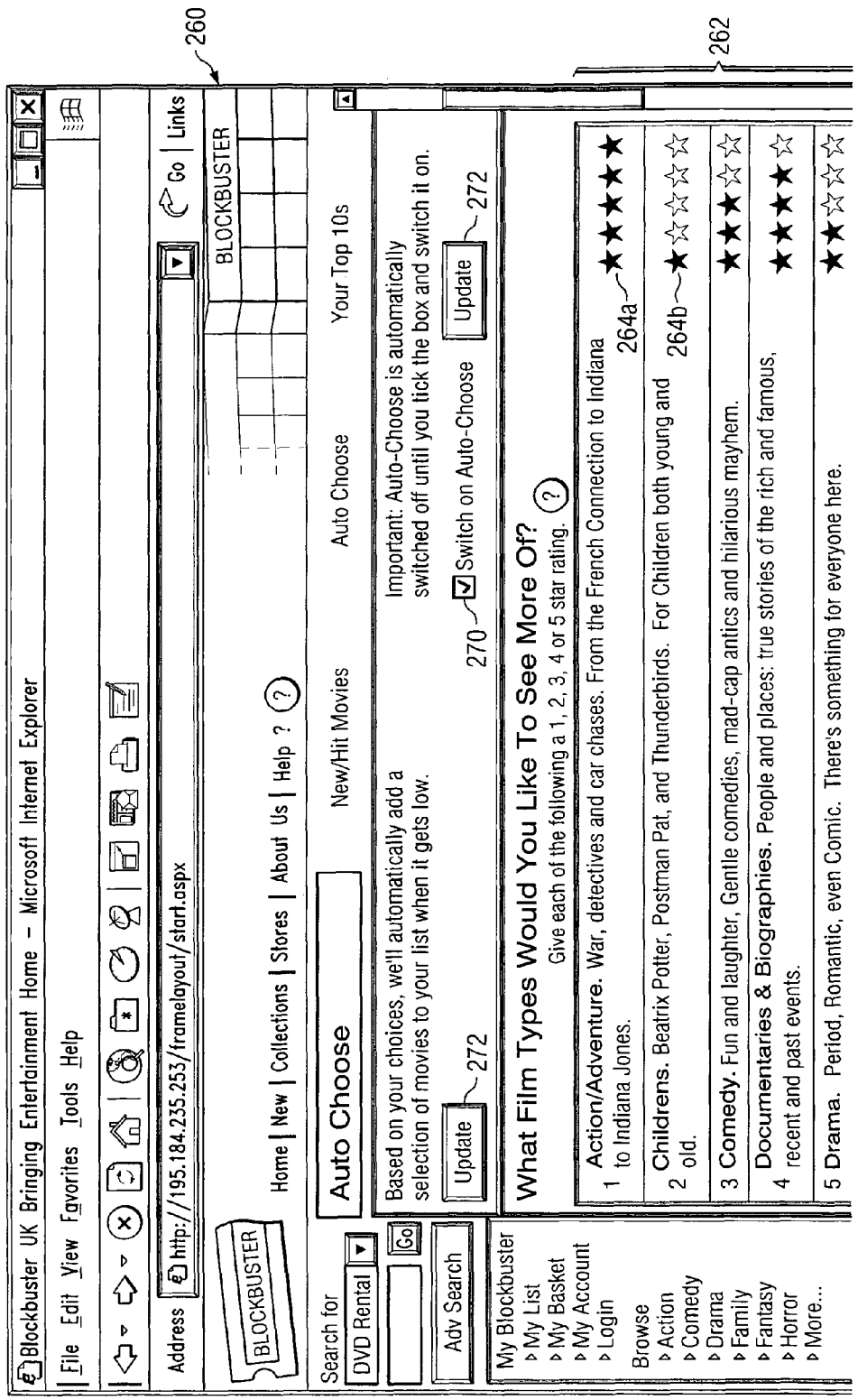
FIG. 9 illustrates a graphical user interface for providing audiovisual works to a client using an automatically generated list of audiovisual works.

FIG. 9 illustrates a GUI 260 that graphically depicts an automatic selection feature. GUI 260 includes various features, such as links, buttons, and checkboxes, that together enable client 16 to activate automatic selection of audiovisual works for delivery to client 16.

In the embodiment illustrated, various genres of movies are presented to client 16 for client 16 to rate. As illustrated, selections of stars 264 by client 16 indicate preferences for each genre. Five stars may represent a high preference for a particular genre, while one star may represent a low preference for the genre. For example, as illustrated, client 16 may indicate a high preference for action/adventure movies using stars 264*a* and a low preference for children's movies using stars 264*b*.

GUI 260 also includes ratings classifications checkboxes 266. Using ratings classifications checkboxes 266, client 16 may include or exclude movies of particular ratings classifications. For example, as illustrated, client 16 has indicated to include movies of every ratings classification except one. Ratings systems may rate audiovisual works in various ways. For example, a rating may indicate age appropriateness and/or content elements. The rating may be directed toward parents. In addition, ratings systems may be developed by independent and/or governments. Various classification rating systems may be used for various audiovisual works. For example, the Motion Picture Association of America rates movies into classifications such as G, PG, PG-13, R, and NC-17. Alternate ratings classifications may be used for movies, for example, the ratings depicted in GUI 260 correspond with ratings classifications for movies in the United Kingdom. Furthermore, alternate types of audiovisual works, such as video games and television, may include other ratings classification systems. In similar ways, client 16 may indicate audiovisual works to include or exclude during automatic selection or using any other appropriate technique.

"Auto-choose" checkbox 270 may be selected or deselected to indicate to host 12 to activate the automatic selection function. Using update button 272, client 16 may indicate to host 12 when client 16 has finished rating movie genres, including or excluding ratings classifications, and determining whether to use the automatic selection feature. By selecting update button 272, client 16 allows host 12 to record information indicated in GUI 260 in account information 54.

When client 16 has indicated to activate automatic selection, the feature may be used at various times by host 12. In some embodiments, automatic selection occurs when the client list becomes short or empty due to delivery of audiovisual works on the client list. In some embodiments, host 12 may update the automatic selection list at appropriate times to include newly released audiovisual works in the client list. Host 12 may use various algorithms to generate an automatic selection list.

FIG. 10 illustrates a GUI 280 that graphically depicts a feature to generate a list of recommended audiovisual works for presentation to client 16 for selection. GUI 280 includes various features, such as links, buttons, and checkboxes, that together enable client 16 to generate a suggested or recommended list audiovisual works according to preferences of client 16 and various other factors.

In the embodiment illustrated, various genres of movies are presented to client 16 for client 16 to rate. As illustrated, selections of stars 284 by client 16 indicate preferences for each genre. Five stars may represent a high preference for a particular genre, while one star may represent a low preference for the genre. For example, as illustrated, client 16 may indicate a low preference for action/adventure movies using stars 284*a* and a high preference for children's movies using stars 284*b*.

GUI 280 also includes ratings classifications checkboxes 286. Using ratings classifications checkboxes 286, client 16 may include or exclude movies of particular ratings classifications. For example, as illustrated, client 16 has indicated to include movies of every ratings classification except one. As discussed above, various classification rating systems may be used for various audiovisual works.

Using continue button 288, client 16 may indicate to host 12 when client 16 has finished rating movie genres and including or excluding ratings classifications. By selecting continue button 288, client 16 allows host 12 to record information indicated in GUI 280 in account information 54. Host 12 may then use various algorithms to generate a recommended list of audiovisual works to present to client 16. As discussed above, the algorithms used to generate the recommended list may be the same, similar, or different when compared with the algorithms used to automatically select audiovisual works to deliver to clients 16. According to some embodiments, the recommended list may be limited by host 12 to a particular number of audiovisual works, such one hundred, and displayed in sets, such as sets of ten. Client 16 may rerun the selection process any number of times, and randomization features included in the algorithms may result in different lists being generated each time. Once the recommended list is presented to client 16, client 16 may select one or more of the recommended audiovisual works to include in the client list.

The preceding GUIs illustrate particular embodiments of Web pages that enable provision of audiovisual works. However these GUIs illustrate only exemplary interfaces, and system 10 contemplates devices using any suitable GUIs or other devices for performing these functions.

Although the present invention has been described in several embodiments, a myriad of changes and modifications may be suggested to one skilled in the art, and it is intended that the present invention encompass such changes and modifications as fall within the present appended claims.

What is claimed is:

1. A method for provisioning audiovisual works to a client, comprising:
   maintaining categorization information specifying, for each of a plurality of audiovisual works, one or more of a plurality of categories;
   maintaining a plurality of delivery slots for a client account, each of the plurality of delivery slots identifying a particular one or more of the plurality of categories;
   associating, by controlling logic executed on a processor, one or more of the categories with each of the plurality of delivery slots in response to input from one or more users associated with the client account;
   for each of the delivery slots, provisioning an audiovisual work from one of the categories associated with the respective delivery slot for delivery to a location associated with the client account, thereby ensuring that the client account has an inventory comprising provisioned audiovisual works for each of the delivery slots;
   receiving information related to return of an audiovisual work; identifying at least one characteristic of the returned audiovisual work;
   identifying one of the delivery slots based on the identified characteristic;
   provisioning a second audiovisual work from one of the categories associated with the identified delivery slot for delivery to the location; and
   determining inventory history for the client account, wherein provisioning the second audiovisual work comprises identifying an audiovisual work in one of the categories associated with the identified delivery slot that is absent from the inventory history for delivery to the location.

2. The method of claim 1, wherein one or more of the categories indicates a genre of audiovisual works.

3. The method of claim 1, wherein one or more of the categories indicates a rating of audiovisual works, the rating specifying a particular one of a plurality of ratings established by a standardized content rating system.

4. The method of claim 1, wherein a first one of the categories comprises characteristics specified by a first user associated with the client account, and wherein a second one of the categories comprises characteristics specified by a second user associated with the client account.

5. The method of claim 1, wherein each of the categories indicates audiovisual works having specified characteristics.

6. The method of claim 1, further comprising:
   receiving preference information specifying characteristics for a selected one of the categories associated with a selected one of the delivery slots; and
   generating a list of audiovisual works using the preference information;
   wherein provisioning the second audiovisual work comprises identifying an audiovisual work in the generated list for delivery to the location.

7. The method of claim 1, further comprising:
   receiving from the one or more users associated with the client account an ordering of audiovisual works in the categories associated with the identified delivery slot;
   wherein provisioning the second audiovisual work comprises identifying a next audiovisual work in one of the categories associated with the identified delivery slot, based on the ordering, for delivery to the location.

8. The method of claim 1, further comprising:
   determining availability information for audiovisual works m the categories associated with the identified delivery slot;
   wherein provisioning the second audiovisual work comprises identifying an available audiovisual work in one of the categories associated with the identified delivery slot, using the availability information, for delivery to the location.

9. The method of claim 1, further comprising:
   determining popularity information for audiovisual works in the categories associated with the identified delivery slot;
   wherein provisioning the second audiovisual work comprises identifying a popular audiovisual work in one of the categories associated with the identified delivery slot, using the popularity information, for delivery to the location.

10. The method of claim 1, wherein the identified characteristic indicates that the returned audiovisual work is in one of the categories associated with the identified delivery slot.

11. The method of claim 1, wherein the audiovisual works are movies.

12. The method of claim 1, further comprising:
receiving from the one or more users associated with the client account preference information regarding genres of audiovisual works;
generating a recommended list of audiovisual works using the preference information;
presenting to the one or more users associated with the client account the recommended list;
receiving from the one or more users associated with the client account a selection of audiovisual works from the recommended list; and
adding the selected audiovisual works to a selected one of the categories.

13. The method of claim 12, further comprising:
determining availability information and popularity information for audiovisual works in an audiovisual library; and determining inventory history for the client account;
wherein generating a recommended list of audiovisual works using the preference information comprises identifying recommended audiovisual works using the availability information, the popularity information, and the inventory history.

14. An apparatus for provisioning audiovisual works to a client, comprising:
a memory operable to:
maintain categorization information specifying, for each of a plurality of audiovisual works, one or more of a plurality of categories; and
maintain a plurality of delivery slots for a client account, each of the plurality of delivery slots identifying a particular one or more of the plurality of categories; and
a controller operable to associate one or more of the categories with each of the plurality of delivery slots in response to input from one or more users associated with the client account, and, for each of the delivery slots, provision an audiovisual work from one of the categories associated with the respective delivery slot for delivery to a location associated with the client account, thereby ensuring that the client account has an inventory comprising provisioned audiovisual works for each of the delivery slots, receive information related to return of an audiovisual work, identify at least one characteristic of the returned audiovisual work, identify one of the delivery slots based on the identified characteristic, provision a second audiovisual work from one of the categories associated with the identified delivery slot for delivery to the location, and determine inventory history for the client account, wherein provisioning the second audiovisual work comprises identifying an audiovisual work in one of the categories associated with the identified delivery slot that is absent from the inventory history for delivery to the location.

15. The apparatus of claim 14, wherein one or more of the categories indicates a genre of audiovisual works.

16. The apparatus of claim 14, wherein one or more of the categories indicates a rating of audiovisual works, the rating specifying a particular one of a plurality of ratings established by a standardized content rating system.

17. The apparatus of claim 14, wherein a first one of the categories comprises characteristics specified by a first user associated with the client account, and wherein a second one of the categories comprises characteristics specified by a second user associated with the client account.

18. The apparatus of claim 14, wherein each of the categories indicates audiovisual works having specified characteristics.

19. The apparatus of claim 14, wherein the controller is further operable to:
receive preference information specifying characteristics for a selected one of the categories associated with a selected one of the delivery slots; and
generate a list of audiovisual works using the preference information; wherein provisioning the second audiovisual work comprises identifying an audiovisual work in the generated list for deliver to the location.

20. The apparatus of claim 14, wherein the controller is further operable to:
receive from the one or more users associated with the client account an ordering of audiovisual works in the categories associated with the identified delivery slot;
wherein provisioning the second audiovisual work comprises identifying a next audiovisual work in one of the categories associated with the identified delivery slot, based on the ordering, for delivery to the location.

21. The apparatus of claim 14, wherein the controller is further operable to:
determine availability information for audiovisual works in the categories associated with the identified delivery slot;
wherein provisioning the second audiovisual work comprises identifying an available audiovisual work in one of the categories associated with the identified delivery slot, using the availability information, for delivery to the location.

22. The apparatus of claim 14, wherein the controller is further operable to:
determine popularity information for audiovisual works in the categories associated with the identified delivery slot;
wherein provisioning the second audiovisual work comprises identifying a popular audiovisual work in one of the categories associated with the identified delivery slot, using the popularity information, for delivery to the location.

23. The apparatus of claim 14, wherein the identified characteristic indicates that the returned audiovisual work is in one of the categories associated with the identified delivery slot.

24. The apparatus of claim 14, wherein the audiovisual works are movies.

25. The apparatus of claim 14, wherein the controller is further operable to:
receive from the one or more users associated with the client account preference information regarding genres of audiovisual works;
generate a recommended list of audiovisual works using the preference information;
present to the one or more users associated with the client account the recommended list;
receive from the one or more users associated with the client account a selection of audiovisual works from the recommended list; and
add the selected audiovisual works to a selected one of the categories.

26. The apparatus of claim 25, wherein the controller is further operable to:
  determine availability information and popularity information for audiovisual works in an audiovisual library; and
  determine inventory history for the client account;
  wherein generating a recommended list of audiovisual works using the preference information comprises identifying recommended audiovisual works using the availability information, the popularity information, and the inventory history.

27. A computer readable medium encoded with logic for provisioning audiovisual works to a client, the logic operable, when executed on a processor, to:
  maintain categorization information specifying, for each of a plurality of audiovisual works, one or more of a plurality of categories;
  maintain a plurality of delivery slots for a client account, each of the plurality of delivery slots identifying a particular one or more of the plurality of categories;
  associate one or more of the categories with each of the plurality of delivery slots in response to input from one or more users associated with the client account; and
  for each of the delivery slots, provision an audiovisual work from one of the categories associated with the respective delivery slot for delivery to a location associated with the client account, thereby ensuring that the client account has an inventory comprising provisioned audiovisual works for each of the delivery slots;
  receive information related to return of an audiovisual work;
  identify at least one characteristic of the returned audiovisual work;
  identify one of the delivery slots based on the identified characteristic;
  provision a second audiovisual work from one of the categories associated with the identified delivery slot for delivery to the location; and
  determine inventory history for the client account, wherein provisioning the second audiovisual work comprises identifying an audiovisual work in one of the categories associated with the identified delivery slot that is absent from the inventory history for delivery to the location.

28. The computer readable medium of claim 27, wherein one or more of the categories indicates a genre of audiovisual works.

29. The computer readable medium of claim 27, wherein one or more of the categories indicates a rating of audiovisual works, the rating specifying a particular one of a plurality of ratings established by a standardized content rating system.

30. The computer readable medium of claim 27, wherein a first one of the categories comprises characteristics specified by a first user associated with the client account, and wherein a second one of the categories comprises characteristics specified by a second user associated with the client account.

31. The computer readable medium of claim 27, wherein each of the categories indicates audiovisual works having specified characteristics.

32. The computer readable medium of claim 27, wherein the logic is further operable when executed to:
  receive preference information specifying characteristics for a selected one of the categories associated with a selected one of the delivery slots; and
  generate a list of audiovisual works using the preference information; wherein provisioning the second audiovisual work comprises identifying an audiovisual work in the generated list for delivery to the location.

33. The computer readable medium of claim 27, wherein the logic is further operable when executed to:
  receive from the one or more users associated with the client account an ordering of audiovisual works in the categories associated with the identified delivery slot;
  wherein provisioning the second audiovisual work comprises identifying a next audiovisual work in one of the categories associated with the identified delivery slot, based on the ordering, for delivery to the location.

34. The computer readable medium of claim 27, wherein the logic is further operable-when executed to:
  determine availability information for audiovisual works in the categories associated with the identified delivery slot;
  wherein provisioning the second audiovisual work comprises identifying an available audiovisual work in one of the categories associated with the identified delivery slot, using the availability information, for delivery to the location.

35. The computer readable medium of claim 27, wherein the logic is further operable when executed to:
  determine popularity information for audiovisual works in the categories associated with the identified delivery slot;
  wherein provisioning the second audiovisual work comprises identifying a popular audiovisual work in one of the categories associated with the identified delivery slot, using the popularity information, for delivery to the location.

36. The computer readable medium of claim 27, wherein the identified characteristic indicates that the returned audiovisual work is in one of the categories associated with the identified delivery slot.

37. The computer readable medium of claim 27, wherein the audiovisual works are movies.

38. The computer readable medium of claim 27, wherein the logic is further operable when executed to:
  receive from the one or more users associated with the client account preference information regarding genres of audiovisual works;
  generate a recommended list of audiovisual works using the preference information;
  present to the one or more users associated with the client account the recommended list;
  receive from the one or more users associated with the client account a selection of audiovisual works from the recommended list; and
  add the selected audiovisual works to a selected one of the categories.

39. The computer readable medium of claim 38, wherein the logic is further operable when executed to:
  determine availability information and popularity information for audiovisual works in an audiovisual library; and
  determine inventory history for the client account;
  wherein generating a recommended list of audiovisual works using the preference information comprises identifying recommended audiovisual works using the availability information, the popularity information, and the inventory history.

* * * * *